(12) United States Patent
Schilling et al.

(10) Patent No.: US 7,167,462 B2
(45) Date of Patent: *Jan. 23, 2007

(54) REMOTE UNIT MULTICHANNEL CDMA SUBTRACTIVE INTERFERENCE CANCELLER

(75) Inventors: Donald L. Schilling, Sands Point, NY (US); John Kowalski, New York, NY (US)

(73) Assignee: InterDigital Technologies Corporation, Wilmington, DE (US)

( * ) Notice: Subject to any disclaimer, the term of this patent is extended or adjusted under 35 U.S.C. 154(b) by 991 days.

This patent is subject to a terminal disclaimer.

(21) Appl. No.: 10/164,209

(22) Filed: Jun. 6, 2002

(65) Prior Publication Data

US 2002/0167925 A1 Nov. 14, 2002

Related U.S. Application Data

(63) Continuation of application No. 09/851,740, filed on May 9, 2001, now Pat. No. 6,868,076, which is a continuation of application No. 09/276,019, filed on Mar. 25, 1999, now Pat. No. 6,259,688, which is a continuation of application No. 08/939,146, filed on Sep. 29, 1997, now Pat. No. 6,014,373, which is a continuation of application No. 08/654,994, filed on May 29, 1996, now Pat. No. 5,719,852, which is a continuation of application No. 08/279,477, filed on Jul. 26, 1994, now Pat. No. 5,553,062, which is a continuation-in-part of application No. 08/051,017, filed on Apr. 22, 1993, now Pat. No. 5,363,403.

(51) Int. Cl.
*H04B 7/216* (2006.01)

(52) U.S. Cl. .................................... 370/335; 370/342
(58) Field of Classification Search ................ 370/335, 370/342, 201, 310, 333, 331, 479, 343, 464, 370/441
See application file for complete search history.

(56) References Cited

U.S. PATENT DOCUMENTS

| 4,470,138 A | 9/1984 | Gutleber |
| 4,901,307 A | 2/1990 | Gilhousen et al. |
| 4,928,274 A | 5/1990 | Gilhousen et al. |
| 5,028,887 A | 7/1991 | Gilmore |

(Continued)

FOREIGN PATENT DOCUMENTS

JP S54-83579 7/1979

(Continued)

OTHER PUBLICATIONS

Moshavi et al., "Multistage Linear Receivers for DS-CDMA Systems", Unpublished Ph.D. dissertation, City University of New York, 1994.

(Continued)

*Primary Examiner*—Chi Pham
*Assistant Examiner*—Alexander O. Boakye
(74) *Attorney, Agent, or Firm*—Volpe and Koenig, P.C.

(57) ABSTRACT

Apparatus employed by a remote unit wherein a plurality of channels are received as a received signal. Each channel is associated with a code. For each of the plurality of channels, others of the plurality of channels are subtracted from the received signal and a result of that subtracting is despread as data for that channel.

2 Claims, 14 Drawing Sheets

U.S. PATENT DOCUMENTS

| | | | |
|---|---|---|---|
| 5,099,493 | A | 3/1992 | Zeger et al. |
| 5,103,459 | A | 4/1992 | Gilhousen et al. |
| 5,151,919 | A | 9/1992 | Dent |
| 5,218,619 | A | 6/1993 | Dent |
| 5,224,122 | A | 6/1993 | Bruckert |
| 5,235,612 | A | 8/1993 | Stilwell et al. |
| 5,237,586 | A | 8/1993 | Bottomley |
| 5,276,704 | A | 1/1994 | Dixon |
| 5,343,494 | A * | 8/1994 | Averst et al. ............... 370/313 |
| 5,343,496 | A | 8/1994 | Honig et al. |
| 5,345,468 | A | 9/1994 | Bi |
| 5,353,304 | A | 10/1994 | Mochizuki |
| 5,377,225 | A | 12/1994 | Davis |
| 5,418,814 | A | 5/1995 | Hulbert |
| 5,467,368 | A | 11/1995 | Takeuchi et al. |
| 5,579,304 | A | 11/1996 | Sugimoto et al. |
| 6,868,076 | B1 | 3/2005 | Schilling et al. |
| 6,868,078 | B1 * | 3/2005 | Schilling et al. ............ 370/342 |

FOREIGN PATENT DOCUMENTS

| | | |
|---|---|---|
| JP | S5732107 | 1/1981 |
| JP | S57-32107 | 2/1982 |
| JP | S5483579 | 9/1983 |
| WO | 93/06550 | 4/1993 |
| WO | 9306550 | 4/1993 |

OTHER PUBLICATIONS

Poor et al., "Single-User Detectors for Multiuser Channels", IEEE Trans. on Commun., vol. 36, No. 1, pp. 50-60, Jan. 1988.

Monk et al., "A Noise-Whitening Approach to Multiple Access Noise Rejection—Part I: Theory and Background", IEEE J. Select. Areas Commun., vol. 12, No. 5, Jun. 1994, pp. 817-827.

Rupf et al., "User-Separating Demodulation for Code-Division Multiple-Access Systems", IEEE J. Select. Areas Commun., vol. 12, No. 5, Jun. 1994, pp. 786-795.

Verdu, "Minimum Probability of Error for Asynchronous Gaussian Multiple-Access Channels", IEEE Trans. Inform. Theory, vol. IT-32, No. 1, Jan. 1986, pp. 85-96.

Xie et al., "Multiuser Signal Detection Using Sequential Decoding," IEEE Trans. Commun., vol. 38, No. 5, May 1990, pp. 578-583.

Viterbi, "Very Low Rate Convolution Codes for Maximum Theoretical Performance of Spread-Spectrum Multiple-Access Channels", IEEE J. on Selected Areas in Communications, vol. 8, No. 4, May 1990, p. 641-649.

Patel et al., "Analysis of a Simple Successive Interference Cancellation Scheme in a DS/CDMA System", IEEE Journal on Selected Areas in Communication, vol. 12, No. 5, Jun. 1994, pp. 796-807.

Kubota et al., "Inter-Channel Interference Cancellation Technique for CDMA Mobile/Personal Communication Base Station", IEEE Second International Symposium on Spread Spectrum Techniques and Applications, ISSTA 92, Nov. 29-Dec. 2, 1992, pp. 91-94.

Dent et al., "CDMA-IC: A Novel Code Division Multiple Access Scheme Based on Interference Cancellation", Proc. PIMRC, Boston, MA, Oct. 1992, 98-102.

Varanasi et al., "Multistage Detection in Asynchronous Code-Division Multiple-Access Communications", IEEE Transactions on Communications, vol. 38, Issue 4, Apr. 1990, pp. 509-519.

Kohno et al., "An Adaptive Canceller of Cochannel Interference for Spread-Spectrum Multiple Access Communication Networks in a Power Line", IEEE Journal on Selected Areas in Communications, vol. 8, No. 4, May 1990, pp. 691-699.

Yoon et al., "A Spread-Spectrum Multiaccess System with Cochannel Interference Cancellation for Multipath Fading Channels", IEEE Journal on Selected Areas in Communication, vol. 11, No. 7, Sep. 1993, pp. 1067-1075.

Varanasi et al., "Near-Optimum Detection in Synchronous Code-Division Multiple-Access Systems", IEEE Transactions on Communications, vol. 39, No. 5, May 1991, pp. 725-739.

Divsalar et al., "Improved CDMA Performance Using Parallel Interference Cancellation", MILCOM '94, Fort Monmouth, NJ, Oct. 1994.

Schneider, "Optimum Detection of Code Division Multiplexed Signals", IEEE Transaction on Aerospace Electronics Systems, vol. AES-15, No. 1, Jan. 1979, pp. 181-185.

Lupas et al., "Linear Multiuser Detectors for Synchronous Code-Division Multiple-Access Channels", IEEE Transactions on Information Theory, vol. 35, No. 1, Jan. 1989, pp. 123-136.

Lupas et al., "Near-Far Resistance of Multiuser Detectors in Asynchronous Channels", IEEE Transactions on Communications, vol. 38, No. 4, Apr. 1990, pp. 496-508.

Zvonar et al., "Coherent and Differentially Coherent Multiuser Detectors For Asynchronous CDMA Frequency-Selective Channels", Military Communications Conference 1992, Conference Record, 'Communications—Fusing Command, Control and Intelligence', IEEE MILCOM '92, pp. 442-446.

Xie et al., "A Family of Suboptimum Detectors for Coherent Multiuser Communications", IEEE Journal Selected Areas in Communications, vol. 8, No. 4, May 1990, pp. 683-690.

Kajiwara et al., "Microcellular CDMA System with a Linear Multiuser Interference Canceller", IEEE Journal on Selected Areas in Communications, vol. 12, No. 4, May 1994, pp. 1994.

Aazhang et al., "Neural Networks for Multiuser Detection in Code-Division Multiple Access Communications", IEEE Transactions on Communications, vol. 40, No. 7, Jul. 1992, pp. 1212-1222.

Iltis et al., "An Adaptive Multiuser Detector with Joint Amplitude and Delay Estimation", IEEE Journal on Selected Areas in Communications, vol. 12, No. 5, Jun. 1994, pp. 774-785.

Chen et al., "An Adaptive Multiuser Receiver for CDMA System", IEEE Journal on Selected Areas in Communication, vol. 12, No. 5, Jun. 1994, pp. 808-816.

Duel-Wallen, "Decorrelating Decision-Feedback Multiuser Detector for Synchronous Code-Division Multiple-Access Channel", IEEE Transactions on Communications, vol. 41, No. 2, Feb. 1993, pp. 285-290.

Wei et al., "Synchronous DS-SSMA System with Improved Decorrelating Decision-Feedback Multiuser Detection", IEEE Transactions on Vehicular Technology, vol. 43, No. 3, Aug. 1994, pp. 767-772.

Jalloul et al., "Performance Analysis of DS/CDMA with Noncoherent M-ary Orthogonal Modulation in Multipath Fading Channels", WINLAB, Dept. Of Electrical Engineering Rutgers The State University of New Jersey.

Patel et al., "Analysis of a Simple Successive Interference Cancellation Scheme in DS/CDMA System", WINLAB, Dept. of Electrical Engineering Rutgers, The State University of New Jersey.

Kawabe et al., "Advanced CDMA Scheme Based on Interference Cancellation".

Tachikawa, "Characteristics of M-ary/Spread Spectrum Multiple Access Communication Systems Using Co-Channel Interference Cancellation Techniques".

S. Moshavi, E. Kanterakis, and D. Schilling, "Multistage Linear Receivers for DS-CDMA Systems," (1994), (unpublished Ph.D. dissertation, City University of New York).

H.V. Poor and S. Verdu, "Single-User Detectors for Multiuser Channels," IEEE Tans. Commun., vol. 36, No. 1, pp. 50-60, Jan. 1988.

A.M. Monk, M. Davis, L.B. Milstein, and C.W. Helstrom, "A Noise-Whitening Approach to Multiple Access Noise Rejection-Part I: Theory and Background," IEEE J. Select. Areas Commun., vol. 12, No. 5, pp. 817-827, Jun. 1994.

M. Rupf, F. Tarkoy, and J.L. Massey, "User-Separating Demodulation for Code-Divisoin Multiple-Access Systems," IEEE J. Select. Aras Commun., vol. 12, No. 5, pp. 786-795, Jun. 1994.

S. Verdu, "Minimum Probability of Error for Asynchronous Gaussian Multiple-Access Channels," IEEE Trans. Inform. Theory, vol. IT-32, No. 1, pp. 85-96, Jan. 1986.

Z. Xie, C.K. Rushforth, and R.T. Short, "Multiuser Signal Detection Using Sequential Decoding," IEEE Trans. Commun., vol. 38, No. 5, pp. 578-583, May 1990.

A.J. Viterbi, "Very Low Rate Convolutional Codes for Maximum Theoretical Performance of Spread-Spectrum Multiple-Access Channels," IEEE J. Select. Areas Commun., vol. 8, No. 4, pp. 641-649, May 1990.

P. Patel and J. Holtzman, "Analysis of a Simple Successive Interference Cancellation Scheme in a DS/CDMA System," IEEE J. Select. Areas Commun., vol. 12, No. 5, pp. 796-807, Jun. 1994.

S. Kubota, S. Kato, and K. Feher, "Inter-Channel Interference Cancellation Technique for CDMA Mobile/Personal Communication Base Stations," Proc. IEEE Int. Symp. Spread Spectrum Tech. Appl. (ISSSTA '92), pp. 91-94, Nov. 1992).

P. Dent, B. Gudmundson, and M. Ewerbring, "CDMA-IC: A Novel Code Division Multiple Access Scheme based on Interference Cancellation," Proc. PIMRC, Boston, MA, Oct. 1992, pp. 98-102.

M.K. Varanasi and B. Aazhang, "Multistage Detection in Asynchronous Code-Division Multiple-Access Communications," IEEE Trans. Commun., vol. 38, No. 4, pp. 509-519, Apr. 1990.

R. Kohno, H. Imai, M. Hatori, and S. Pasupathy "An Adaptive Canceller of Cochannel Interference for Spread-Spectrum Multiple-Access Communication Networks in a Power Line," IEEE J. Select. Areas Commun., vol. 8, No. 4, pp. 691-699, May 1990.

Y.C. Yoon, R. Kohno, and H. Imai, "A Spread-Spectrum Multiaccess System with Cochannel Interference Cancellation for Multipath Fading Channels," IEEE J. Select. Areas Commun., vol. 11, No. 7, pp. 1067-1075, Sep. 1993.

M.K. Varanasi and B. Aazhang, "Near-Optimum Detection in Synchronous Code-Division Multiple-Access Systems," IEEE Trans. Commun., vol. 39, No. 5, pp. 725-736, May 1991.

D. Divsalar and M.K. Simon, "Improved CDMA Performance using Parallel Interference Cancellation," MILCOM'94, Fort Monmouth, NJ, Oct. 1994.

K.S. Schneider, "Optimum Detection of Code Division Multiplexed Signals," IEEE Trans. Aerospace Electronic. Syst., vol. AES-15, No. 1, pp. 181-185, Jan. 1979.

R. Lupas and S. Verdu, "Linear Multiuser Detectors for Synchronous Code-Division Multiple-Access Channels," IEEE Trans. Inform. Theory, vol. 35, No. 1, pp. 123-136, Jan. 1989.

R. Lupas and S. Verdu, "Near-Far Resistance of Multiuser Detectors in Asynchronous Channels," IEEE Trans. Commun., vol. 38, No. 4, pp. 496-508, Apr. 1990.

Z. Zvonar and D. Brady, "Coherent and Differentially Coherent Multiuser Detectors for Asynchronous CDMA Frequency-Selective Channels," Proc. IEEE MILCOM'92, pp. 442-446.

Z. Xie, R.T. Short, and C.K. Rushforth, "A Family of Suboptimum Detectors for Coherent Multiuser Communications," IEEE J. Select. Areas Commun., vol. 8, No. 4, pp. 683-690, May 1990.

A. Kajiwara and M. Nakagawa, "Microcellular CDMA System with a Linear Multiuser Interference Canceller," IEEE J. Select Areas Commun., vol. 12, No. 4, pp. 605-611, May 1994.

B. Aazhang, B. Paris, and G.C. Orsak, "Neural Networks for Multiuser Detection in Code-Division Multiple-Access Communications," IEEE Trans. Commun., vol. 40, No. 7, pp. 1212-1222, Jul. 1992.

R.A. Iltis and L. Mailaender, "An Adaptive Multiuser Detector with Joint Amplitude and Delay Estimation," IEEE J. Select. Areas Commun., vol. 12, No. 5, pp. 774-785, Jun. 1994.

D.S. Chen and S. Ray, "An Adaptive Multiuser Receiver for CDMA System," IEEE J. Select. Areas Commun., vol. 12, No. 5, pp. 808-816, Jun. 1994.

A. Duel-Wallen, "Decorrelating Decision-Feedback Multiuser Detector for Synchronous Code-Division Multiple-Access Channel," IEEE Trans. Commun., vol. 41, No. 2, pp. 285-290, Feb. 1993.

L. Wei and C. Schlegal, "Synchronous DS-SSMA System with Improved Decorrelating Decision-Feedback Multiuser Detection," IEEE Trans. Veh. Technol., vol. 43, No. 3, pp. 767-772, Aug. 1994.

Jalloul, Louary M.A. and Holtzman, Jack M., "Performance Analysis of DS/CDMA with Noncoherent M-ary Orthogonal Modulation in Multipath Fading Channels," WINLAB, Dept. Of Electrical Engineering, Rutgers, The State University of New Jersey.

Patel, Pulin and Holtzman, Jack, "Analysis of a Simple Successive Interference Cancellation Scheme in DS/CDMA System," WINLAB, Dept. Of Electrical Engineering, Rutgers, The State University of New Jersey.

M. Kawabe, T. Kato, A. Kawahashi, T. Sato and A. Fukasawa, "Advanced CDMA Scheme Based on Interference Cancellation".

S. Tachikawa, "Characteristics of M-ary/Spread Spectrum Multiple Access Communication Systems Using Co-Channel Interference Cancellation Techniques".

* cited by examiner

REMOTE UNIT MULTICHANNEL CDMA SUBTRACTIVE INTERFERENCE CANCELLER

CROSS REFERENCE TO RELATED APPLICATIONS

This application is a continuation of application Ser. No. 09/851,740, filed May 9, 2001, now U.S. Pat. No. 6,868,076 which is a continuation of application Ser. No. 09/276,019, filed Mar. 25, 1999, now U.S. Pat. No. 6,259,688, which is a continuation of U.S. application Ser. No. 08/939,146, filed Sep. 29, 1997, now U.S. Pat. No. 6,014,373, which is a continuation of U.S. application Ser. No. 08/654,994, filed May 29, 1996, now U.S. Pat. No. 5,719,852, which is a continuation of U.S. application Ser. No. 08/279,477, filed Jul. 26, 1994, now U.S. Pat. No. 5,553,062, which is a continuation-in-part of U.S. application Ser. No. 08/051,017, filed Apr. 22, 1993, now U.S. Pat. No. 5,363,403, all of which are incorporated herein by reference.

BACKGROUND

This invention relates to spread-spectrum communications, and more particularly to an interference canceler and method for reducing interference in a direct sequence, code division multiple access receiver.

DESCRIPTION OF THE RELEVANT ART

Direct sequence, code division multiple access, spread-spectrum communications systems are capacity limited by interference caused by other simultaneous users. This is compounded if adaptive power control is not used, or is used but is not perfect.

Code division multiple access is interference limited. The more users transmitting simultaneously, the higher the bit error rate (BER). Increased capacity requires forward error correction (FEC) coding, which is turn, increases the data rate and limits capacity.

SUMMARY

Apparatus employed by a remote unit wherein a plurality of channels are received as a received signal. Each channel is associated with a code. For each of the plurality of channels, others of the plurality of channels are subtracted from the received signal and a result of that subtracting is despread as data for that channel.

BRIEF DESCRIPTION OF THE DRAWING(S)

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENT(S)

Figure 1:
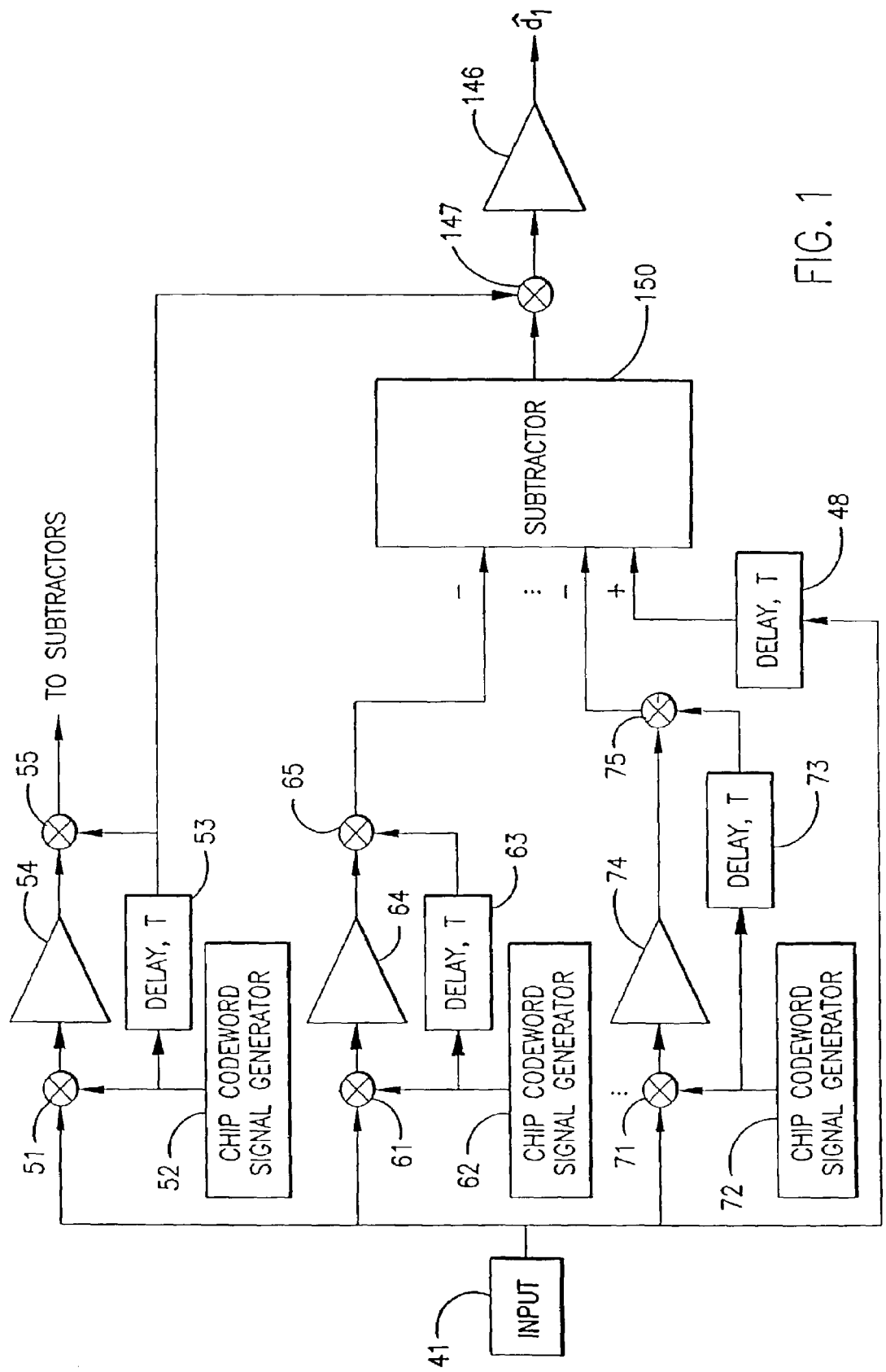
FIG. 1 is a block diagram of the spread-spectrum CDMA interference canceler using correlators.

Reference now is made in detail to the present preferred embodiments of the invention, examples of which are illustrated in the accompanying drawings, wherein like reference numerals indicate like elements throughout the several views.

In the exemplary arrangement shown in FIG. 1, a spread-spectrum code division multiple access (CDMA) interference canceler is provided for reducing interference in a spread-spectrum CDMA receiver having N channels. The present invention also works on a spread-spectrum code division multiplexed (CDMA) system. Accordingly, without loss of generality, the term spread-spectrum CDMA signal, as used herein, includes spread-spectrum CDMA signals and spread-spectrum CDM signals. In a personal communications service, the interference canceler may be used at a base station or in a remote unit such as a handset.

FIG. 1 illustrates the interference canceler for the first channel, defined by the first chip-code signal. The interference canceler includes a plurality of despreading means, a plurality of timing means, a plurality of spread-spectrum-processing means, subtracting means, and first channel-despreading means.

Using a plurality of chip-code signals, the plurality of despreading means despreads the received spread-spectrum CDMA signals as a plurality of despread signals, respectively. In FIG. 1 the plurality of despreading means is shown as first despreading means, second despreading means, through $N^{th}$ despreading means. The first despreading means includes a first correlator, which is embodied, by way of example, as a first mixer 51, first chip-code-signal generator 52, and a first integrator 54. The first integrator 54 alternatively may be a first lowpass filter or a first bandpass filter. The first mixer 51 is coupled between the input 41 and the first chip-code-signal generator 52 and the first integrator 54.

The second despreading means includes a second correlator, which is embodied, by way of example, as second mixer 61, second chip-code-signal generator 62 and second integrator 64. The second integrator 64 alternatively may be a second lowpass filter or a second bandpass filter. The second mixer 61, is coupled between the input 41, the second chip-code-signal generator 62, and the second integrator 64.

The $N^{th}$ despreading means is depicted as an $N^{th}$ correlator shown, by way of example, as $N^{th}$ mixer 71, and $N^{th}$ chip-code-signal generator 72, and $N^{th}$ integrator 74. The $N^{th}$ integrator 74 alternatively may be an $N^{th}$ lowpass filter or an $N^{th}$ bandpass filter. The $N^{th}$ mixer 71 is coupled between the input 41, the $N^{th}$ chip-code-signal generator 72 and the $N^{th}$ integrator 74.

As is well known in the art, the first through $N^{th}$ despreading means may be embodied as any device which can despread a channel in a spread-spectrum signal.

The plurality of timing means may be embodied as a plurality of delay devices 53, 63, 73. A first delay device 53 has a delay time T, which is approximately the same as the integration time $T_b$ of first integrator 54, or time constant of the first lowpass filter or first bandpass filter. A second delay device 63 has a time delay T, which is approximately the same as the integration time $T_b$ of second integrator 64, or time constant of the second lowpass filter or second bandpass filter. Similarly, the $N^{th}$ delay device 73 has a time delay T, which is approximately the same as the integration time $T_b$ of $N^{th}$ integrator 74, or time constant of the $N^{th}$ lowpass filter or $N^{th}$ bandpass filter. Typically, the integration times of the first integrator 54, second integrator 64 through $N^{th}$ integrator 74 are the same. If lowpass filters are used, then typically the time constants of the first lowpass filter, second lowpass filter through $N^{th}$ lowpass filter are the same. If bandpass filters are used, then the time constants of the first bandpass filter, second bandpass filter through $N^{th}$ bandpass filter are the same.

The plurality of spread-spectrum-processing means regenerators each of the plurality of despread signals as a plurality of spread-spectrum signals. The plurality of spread-spectrum-processing means uses a timed version, i.e. delayed version, of the plurality of chip-code signals, for spread-spectrum processing the plurality of despread signals, respectively, with a chip-code signal corresponding to a respective despread signal. The plurality of spread-spectrum-processing means is shown, by way of example, as a first processing mixer 55, a second processing mixer 65, through an $N^{th}$ processing mixer 75. The first processing mixer 55 is coupled to the first integrator 54, and through a first delay device 53 to the first chip-code-signal generator 52. The second processing mixer 65 is coupled to the second integrator 64, and through the second delay device 63 to the second chip-code-signal generator 62. The $N^{th}$ processing mixer 75 is coupled to the $N^{th}$ integrator 74 through the delay device 73 to the $N^{th}$ chip-code-signal generator 72.

For reducing interference to a channel using an $i^{th}$ chip-code signal of the spread-spectrum CDMA signal, the subtracting means subtracts, from the spread-spectrum CDMA signal, each of the N−1 spread-spectrum-processed-despread signals not corresponding to the $i^{th}$ channel. The subtracting means thereby generates a subtracted signal. The subtracting means is shown as a first subtractor 150. The first subtractor 150 is shown coupled to the output of the second processing mixer 65, through the $N^{th}$ processing mixer 75. Additionally, the first subtractor 150 is coupled through a main delay device 48 to the input 41.

The $i^{th}$ channel-despreading means despreads the subtracted signal with the $i^{th}$ chip-code signal as the $i^{th}$ channel. The first channel-despreading means is shown as a first channel mixer 147. The first channel mixer 147 is coupled to the first delay device 53, and to the first subtractor 150. The first channel integrator 146 is coupled to the first channel mixer 147.

The first chip-code-signal generator 52, the second chip-code-signal generator 62, through the $N^{th}$ chip-code signal generator 72 generate a first chip-code signal, a second chip-code signal, through a $N^{th}$ chip-code signal, respectively. The term "chip-code signal" is used herein to mean the spreading signal of a spread-spectrum signal, as is well known in the art. Typically the chip-code signal is generated from a pseudorandom (PN) sequence. The first chip-code signal, the second chip code signal, through the $N^{th}$ chip-code signal might be generated from a first PN sequence, a second PN sequence, through a $N^{th}$ PN sequence, respectively. The first PN sequence is defined by or generated from a first chip codeword, the second PN sequence is defined by or generated from a second chip codeword, through the $N^{th}$ PN sequence is defined by or generated from a $N^{th}$ chip-codeword. Each of the first chip codeword, second chip codeword through $N^{th}$ chip codeword is distinct, i.e. different from one another. In general, a chip codeword can be the actual sequence of a PN sequence, or used to define settings for generating the PN sequence. The settings might be the delay taps of shift registers, for example.

A first channel of a received spread-spectrum CDMA signal at input 41 is despread by first mixer 51 as a first despread signal, using the first chip-code signal generated by first chip-code-signal generator 52. The first despread signal from the first mixer 51 is filtered through first integrator 54. First integrator 54 integrates for a time $T_b$, the time duration of a symbol such as a bit. At the same time, the first chip-code signal is delayed by time T by delay device 53. The delay time T is approximately equal to the integration time $T_b$ plus system or component delays. Systems or component delays are usually small, compared to integration time $T_b$.

The delayed version of the first chip-code signal is processed with the first despread signal from the output of the first integrator 54 using the first spreading mixer 55. The output of the first spreading mixer 55 is fed to subtractors other than first subtractor 150 for processing the second through $N^{th}$ channels of the spread-spectrum CDMA signal.

For reducing interference to the first channel of the spread-spectrum CDMA signal, the received spread-spectrum CDMA signal is processed by the second through $N^{th}$ despreaders as follows. The second channel of the spread-spectrum CDMA signal is despread by the second despreading means. At the second mixer 61, a second chip-code signal, generated by the second chip-code-signal generator 62, despreads the second channel of the spread-spectrum CDMA signal. The despread second channel is filtered through second integrator 64. The output of the second integrator 64 is the second despread signal. The second despread signal is spread-spectrum processed by second processing mixer 65 by a delayed version of the second chip-code signal. The second chip-code signal is delayed through delay device 63. The delay device 63 delays the second chip-code signal by time T. The second channel mixer 65 spread-spectrum processes a timed version, i.e. delayed version, of the second chip-code signal with the filtered version of the second spread-spectrum channel from second integrator 64. The term "spread-spectrum process" as used herein includes any method for generating a spread-spectrum signal by mixing or modulating a signal with a chip-code signal. Spread-spectrum processing may be done by product devices, EXCLUSIVE-OR gates, matched filters, or any other device or circuit as is well known in the art.

Similarly, the $N^{th}$ channel of the spread-spectrum CDMA signal is despread by the $N^{th}$ despreading means. Accordingly, the received spread-spectrum CDMA signal has the $N^{th}$ channel despread by $N^{th}$ mixer 61, by mixing the spread-spectrum CDMA signal with the $N^{th}$ chip-code signal from $N^{th}$ chip-code-signal generator 72. The output of the $N^{th}$ mixer 71 is filtered by $N^{th}$ integrator 74. The output of the $N^{th}$ integrator 74, which is the $N^{th}$ despread signal, is a despread and filtered version of the $N^{th}$ channel of the spread-spectrum CDMA signal. The $N^{th}$ despread signal is spread-spectrum processed by a delayed version of the $N^{th}$ chip-code signal. The $N^{th}$ chip-code signal is delayed through $N^{th}$ delay device 73. The $N^{th}$ processing mixer 75 spread-spectrum processes the timed version, i.e. a delayed version, of the $N^{th}$ chip-code signal with the $N^{th}$ despread signal.

At the first subtractor 150, each of the outputs of the second processing mixer 65 through the $N^{th}$ processing mixer 75 is subtracted from a timed version, i.e. a delayed version, of the spread-spectrum CDMA signal from input 41. The delay of the spread-spectrum CDMA signal is timed through the first main delay device 48. Typically, the delay of the first main delay device 48 is time T, which is approximately equal to the integration time of the first integrator 54 through $N^{th}$ integrator 74.

At the output of the first subtractor 150, is generated a first subtracted signal. The first subtracted signal, for the first channel of the spread-spectrum CDMA signal, is defined herein to be the outputs from the second processing mixer 65 through $N^{th}$ processing mixer 75, subtracted from the delayed version of the spread-spectrum CDMA signal. The second subtracted signal through $N^{th}$ subtracted signal are similarly defined.

The delayed version of the first chip-code signal from the output of first delay device 53 is used to despread the output of the first subtractor 150. Accordingly, the first subtracted signal is despread by the first chip-code signal by first channel mixer 147. The output of the first channel mixer 147 is filtered by first channel integrator 147. This produces an output estimate $d_1$ of the first channel of the spread-spectrum CDMA signal.

Figure 2:
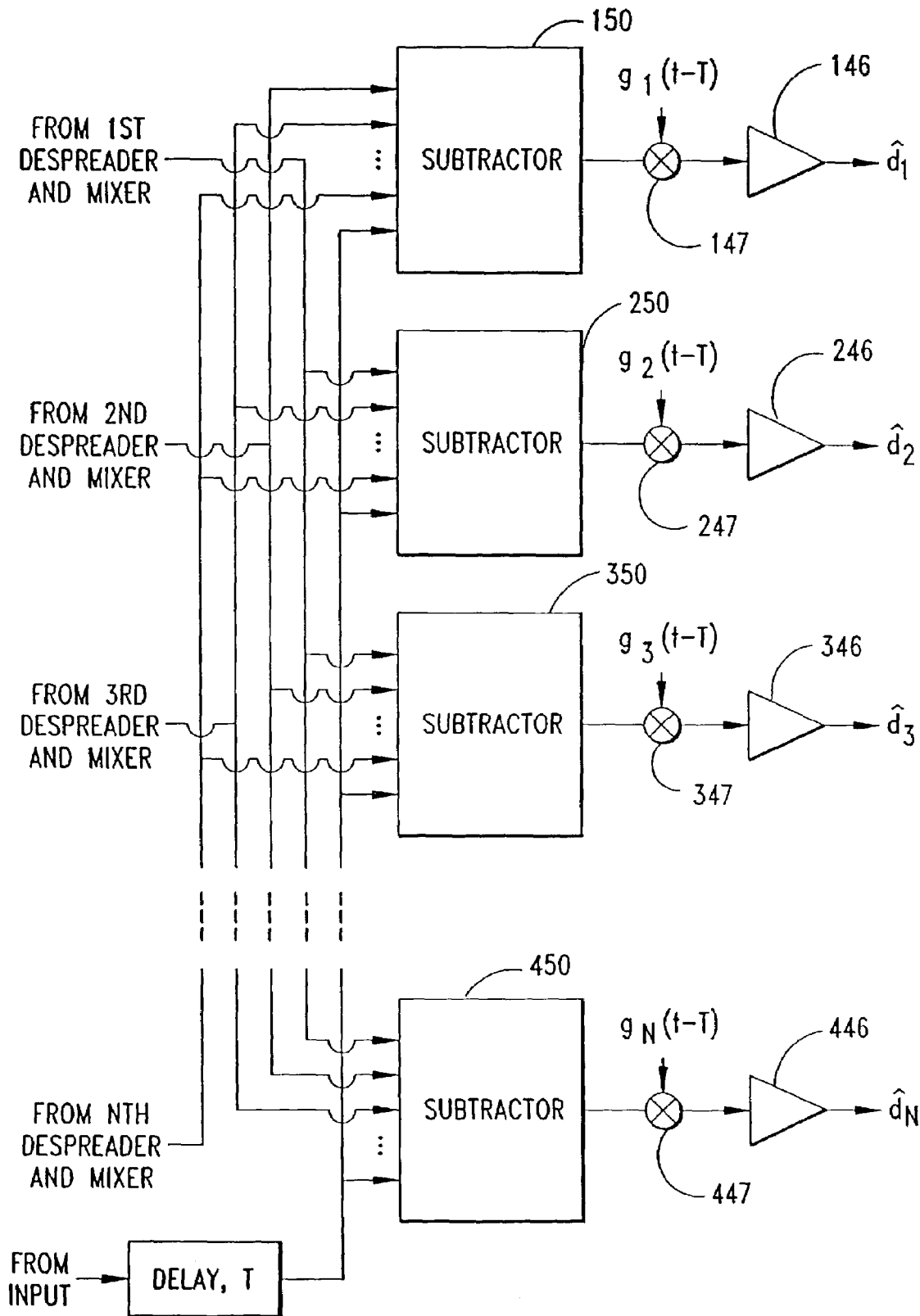
FIG. 2 is a block diagram of the spread-spectrum CDMA interference canceler for processing multiple channels using correlators.

As illustratively shown in FIG. 2, a plurality of subtractors 150, 250, 350, 450 can be coupled appropriately to the input 41 and to a first spreading mixer 55, second spreading mixer 65, third spreading mixer, through an $N^{th}$ spreading mixer 75 of FIG. 1. The plurality of subtractors 150, 250, 350, 450 also are coupled to the main delay device 48 from the input 41. This arrangement can generate a first subtracted signal from the first subtractor 150, a second subtracted signal from the second subtractor 250, a third subtracted signal from the third subtractor 350, through an $N^{th}$ subtracted signal from an $N^{th}$ subtractor 450.

The outputs of the first subtractor 150, second subtractor 250, third subtractor 350, through the $N^{th}$ subtractor 450 are each coupled to a respective first channel mixer 147, second channel mixer 247, third channel mixer 347, through $N^{th}$ channel mixer 447. Each of the channel mixers is coupled to a delayed version of the first chip-code signal, $g_1$ (t-T), second chip-code signal, $g_2$ (t-T), third chip-code signal, $g_3$ (t-T), through $N^{th}$ chip-code signal, $g_N$ (t-T). The outputs of each of the respective first channel mixer 147, second channel mixer 247, third channel mixer 347, through $N^{th}$ channel mixer 447 are coupled to a first channel integrator 146, second channel integrator 246, third channel integrator 346 through $N^{th}$ channel integrator 446, respectively. At the output of each of the channel integrators is produced an estimate of the respective first channel $d_1$, second channel $d_2$, third channel $d_3$, through $N^{th}$ channel $d_N$.

Referring to FIG. 1, use of the present invention is illustrated for the first channel of the spread-spectrum CDMA signal, with the understanding that the second through $N^{th}$ CDMA channels work similarly. A received spread-spectrum CDMA signal at input 41 is delayed by delay device 48 and fed to the first subtractor 150. The spread-spectrum CDMA signal has the second channel through $N^{th}$ channel despread by second mixer 61 using the second chip-code signal, through the $N^{th}$ mixer 71 using the $N^{th}$ chip-code signal. The respective second chip-code signal through the $N^{th}$ chip-code signal are generated by the second chip-code-signal generator 62 through the $N^{th}$ chip-code-signal generator 72. The second channel through $N^{th}$ channel are despread and filtered through the second integrator 64 through the $N^{th}$ integrator 74, respectively. The despreading removes, partially or totally, the non-despread channels at the outputs of each of the second integrator 64 through $N^{th}$ integrator 74.

In a preferred embodiment, each of the chip-code signal used for the first chip-code-signal generator 52, second chip-code-signal generator 62 through the $N^{th}$ chip-code-signal generator 72, are orthogonal to each other. Use of chip-code signals having orthogonality however, is not required for operation of the present invention. When using orthogonal chip-code signals, the despread signals have the respective channel plus noise at the output of each of the integrators. With orthogonal chip-code signals, theoretically the mixers remove channels orthogonal to the despread channel. The respective channel is spread-spectrum processed by the respective processing mixer.

Figure 3:
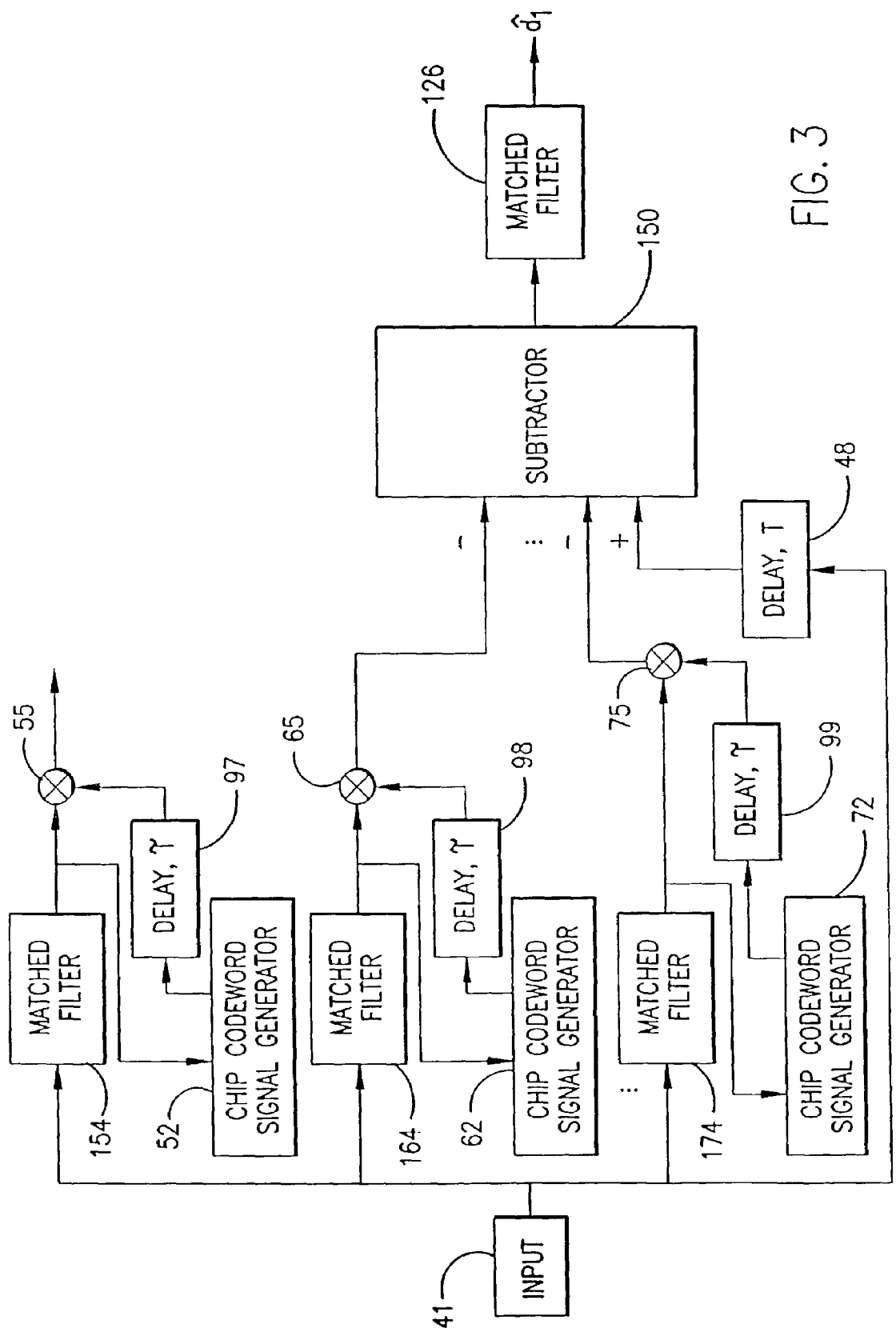
FIG. 3 is a block diagram of the spread-spectrum CDMA interference canceler using matched filters.

At the output of the second processing mixer 65 through the $N^{th}$ processing mixer 75 is a respread version of the second channel through the $N^{th}$ channel, plus noise components contained therein. Each of the second channel through $N^{th}$ channel is then subtracted from the received spread-spectrum CDMA signal by the first subtractor 150. The first subtractor 150 produces the first subtracted signal. The first subtracted signal is despread by a delayed version of the first chip-code signal by first channel mixer 147, and filtered by first channel filter 146. Accordingly, prior to despreading the first channel of the spread-spectrum CDMA signal, the second through $N^{th}$ channels plus noise components aligned with these channels are subtracted from the received spread-spectrum CDMA signal. As illustratively shown in FIG. 3, an alternative embodiment of the spread-spectrum CDMA interference canceler includes a plurality of first despreading means, a plurality of spread-spectrum-processing means, subtracting means, and second despreading means. In FIG. 3, the plurality of despreading means is shown as first despreading means, second despreading means through $N^{th}$ despreading means. The first despreading means is embodied as a first matched filter 154. The first matched filter 154 has an impulse response matched to the first chip-code signal, which is used to spread-spectrum process and define the first channel of the spread-spectrum CDMA signal. The first matched filter 154 is coupled to the input 41.

The second despreading means is shown as second matched filter 164. The second matched filter 164 has an impulse response matched to the second chip-code signal, which is used to spread-spectrum process and define the second channel of the spread-spectrum CDMA signal. The second matched filter 164 is coupled to the input 41.

The $N^{th}$ despreading means is shown as an $N^{th}$ matched filter 174. The $N^{th}$ matched filter has an impulse response matched to the $N^{th}$ chip-code signal, which is used to spread-spectrum process and define the $N^{th}$ channel of the spread-spectrum CDMA signal. The $N^{th}$ matched filter is coupled to the input 41.

The term matched filter, as used herein, includes any type of matched filter that can be matched to a chip-code signal. The matched filter may be a digital matched filter or analog matched filter. A surface acoustic wave (SAW) device may be used at a radio frequency (RF) or intermediate frequency (IF). Digital signal processors and application specific integrated circuits (ASIC) having matched filters may be used at RF, IF or baseband frequency.

In FIG. 3, the plurality of spread-spectrum-processing means is shown as the first processing mixer 55, the second processing mixer 65, through the $N^{th}$ processing mixer 75. The first processing mixer 55 may be coupled through a first adjustment device 97 to the first chip-code-signal generator 52. The second processing mixer 65 may be coupled through the second adjustment device 98 to the second chip-code-signal generator 62. The $N^{th}$ processing mixer 75 may be coupled through the $N^{th}$ adjustment device 99 to the $N^{th}$ chip-code-signal generator 72. The first adjusting device 97, second adjustment device 98 through $N^{th}$ adjustment device 99 are optional, and are used as an adjustment for aligning the first chip-code signal, second chip-code signal through $N^{th}$ chip-code signal with the first despread signal, second despread signal through $N^{th}$ despread signal, outputted from the first matched filter 154, second matched filter 164 through $N^{th}$ matched filter 174, respectively.

The subtracting means is shown as the first subtractor 150. The first subtractor 150 is coupled to the output of the second processing mixer 65, through the $N^{th}$ processing mixer 75. Additionally, the first subtractor 150 is coupled through the main delay device 48 to the input 41.

The first channel-despreading means is shown as a first channel-matched filter 126. The first channel-matched filter 126 is coupled to the first subtractor 150. The first channel-matched filter 126 has an impulse response matched to the first chip-code signal.

A first channel of a received spread-spectrum CDMA signal, at input 41, is despread by first matched filter 154. The first matched filter 154 has an impulse response matched to the first chip-code signal. The first chip-code signal defines the first channel of the spread-spectrum CDMA signal, and is used by the first chip-code-signal generator 52. The first chip-code signal may be delayed by adjustment time τ by adjustment device 97. The output of the first matched filter 154 is spread-spectrum processed by the first processing mixer 55 with the first chip-code signal. The output of the first processing mixer 55 is fed to subtractors other than the first subtractor 150 for processing the second channel through the $N^{th}$ channel of the spread-spectrum CDMA signals.

For reducing interference to the first spread-spectrum channel, the received spread-spectrum CDMA signal is processed by the second despreading means through $N^{th}$ despreading means as follows. The second matched filter 164 has an impulse response matched to the second chip-code signal. The second chip-code signal defines the second channel of the spread-spectrum CDMA signal, and is used by the second chip-code-signal generator 62. The second matched filter 164 despreads the second channel of the spread-spectrum CDMA signal. The output of the second matched filter 164 is the second despread signal. The second despread signal triggers second chip-code-signal generator 62. The second despread signal also is spread-spectrum processed by second processing mixer 65 by a timed version of the second chip-code signal. The timing of the second chip-code signal triggers the second despread signal from the second matched filter 164.

Similarly, the $N^{th}$ channel of the spread-spectrum CDMA signal is despread by the $N^{th}$ despreading means. Accordingly, the received spread-spectrum CDMA signal has the $N^{th}$ channel despread by $N^{th}$ matched filter 174. The output of the $N^{th}$ matched filter 174 is the $N^{th}$ despread signal, i.e. a despread and filtered version of the $N^{th}$ channel of the spread-spectrum CDMA signal. The $N^{th}$ despread signal is spread-spectrum processed by a timed version of the $N^{th}$ chip-code signal. The timing of the $N^{th}$ chip-code signal is triggered by the $N^{th}$ despread signal from the $N^{th}$ matched filter 174. The $N^{th}$ processing mixer 75 spread-spectrum processes the timed version of the $N^{th}$ chip-code signal with the $N^{th}$ despread signal.

At the first subtractor 150, each of the outputs of the second processing mixer 65 through the $N^{th}$ processing mixer 75 are subtracted from a delayed version of the spread-spectrum CDMA signal from input 41. The delay of the spread-spectrum CDMA signal is timed through delay device 48. The time of delay device 48 is set to align the second through $N^{th}$ spread-spectrum-processed-despread signals for subtraction from the spread-spectrum CDMA signal. This generates at the output of the first subtractor 150, a first subtracted signal. The subtracted signal is despread by the first channel-matched filter 126. This produces an output estimate $d_1$ of the first channel of the spread-spectrum CDMA signal.

Figure 4:
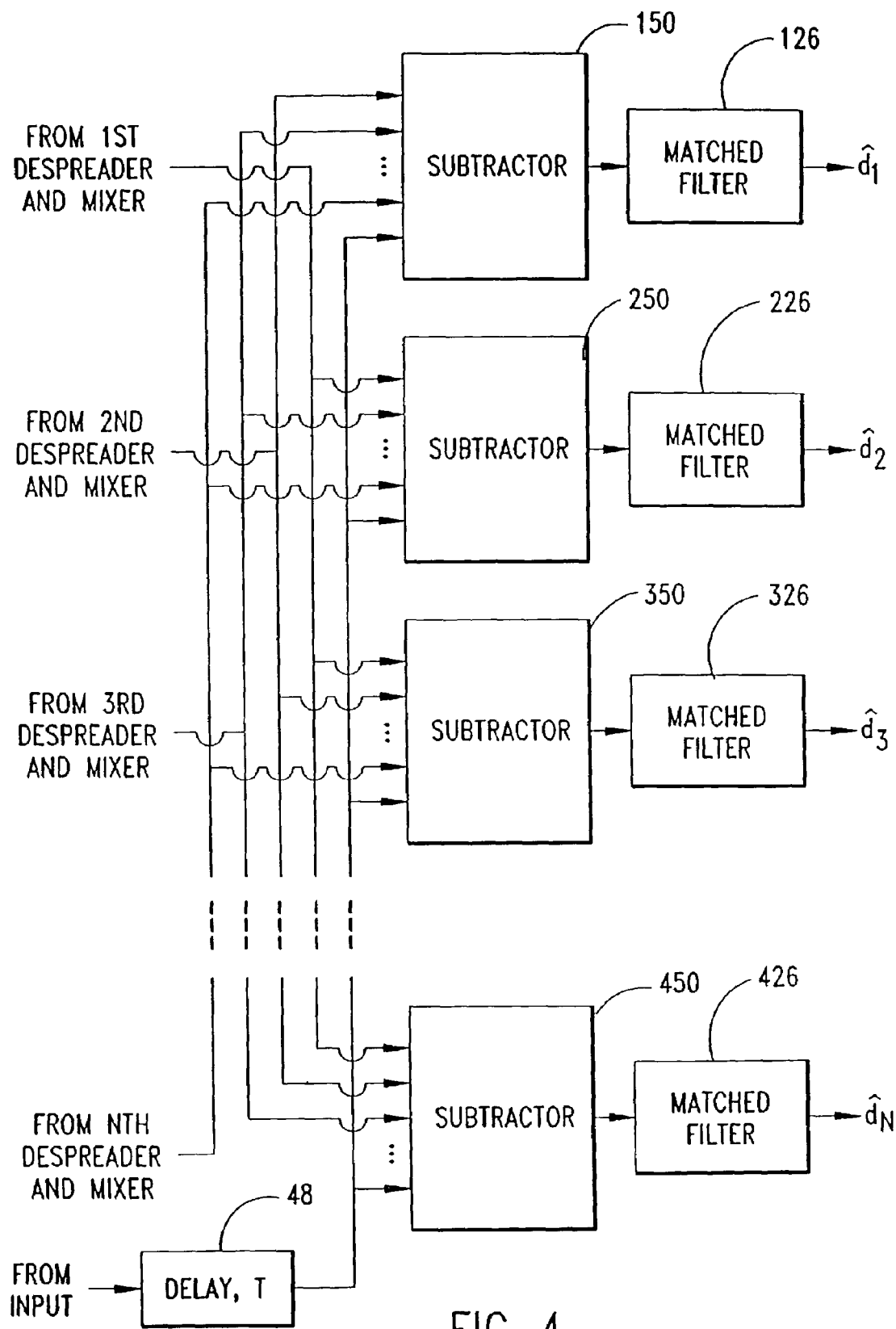
FIG. 4 is a block diagram of the spread-spectrum CDMA interference canceler for processing multiple channels using matched filters.

As illustrated in FIG. 4, a plurality of subtractors 150, 250, 350, 450 can be coupled appropriately to the output from a first processing mixer, second processing mixer, third processing mixer, through a $N^{th}$ processing mixer, and to a main delay device form the input. A first subtracted signal is outputted from the first subtractor 150, a second subtracted signal is outputted form the second subtractor 250, a third subtracted signal is outputted from the third subtractor 350, through an $N^{th}$ subtractor signal is outputted from the $N^{th}$ subtractor 450.

The output of the first subtractor 150, second subtractor 250, third subtractor 350, through the $N^{th}$ subtractor 450 are each coupled to a respective first channel-matched filter 126, second channel-matched filter 226, third channel-matched filter 326, through $N^{th}$ channel-matched filter 426. The first channel-matched filter 126, second channel-matched filter 226, third channel-matched filter 326 through $N^{th}$ channel-matched filter 426 have an impulse response matched the first chip-code signal, second chip-code signal, third chip-code signal, through $N^{th}$ chip-code signal, defining the first channel, second channel, third channel through $N^{th}$ channel, respectively, of the spread-spectrum CDMA signal. At each of the outputs of the respective first channel-matched filter 126, second channel-matched filter 226, third channel-matched filter 326, through $N^{th}$ channel-matched filter 426, is produced an estimate of the respective first channel $d_1$, second channel $d_2$, third channel $d_3$, through $N^{th}$ channel $d_N$.

In use, the present invention is illustrated for the first channel of the spread-spectrum CDMA signal, with the understanding that the second channel through $N^{th}$ channel work similarly. A received spread-spectrum CDMA signal at input 41 is delayed by delay device 48 and fed to subtractor 150. The same spread-spectrum CDMA signal has the second through $N^{th}$ channel despread by the second matched filter 164 through the $N^{th}$ matched filter 174. This despreading removes the other CDMA channels form the respective despread channel. In a preferred embodiment, each of the chip-code signals used for the first channel, second channel, through the $N^{th}$ channel, is orthogonal to the other chip-code signals. At the output of the first matched filter 154, second matched filter 164 through $N^{th}$ matched filter 174, are the first despread signal, second despread signal through $N^{th}$ despread signal, plus noise.

The respective channel is spread-spectrum processed by the processing mixers. Accordingly, at the output of the second processing mixer 65 through the $N^{th}$ processing mixer 75 is a spread version of the second despread signal through the $N^{th}$ despread signal, plus noise components contained therein. Each of the spread-spectrum-processed-despread signals, is then subtracted from the received spread-spectrum CDMA signal by the first subtractor 150. This produces the first subtracted signal.

The first subtracted signal is despread by first channel-matched filter 126. Accordingly, prior to despreading the first channel of the spread-spectrum CDMA signal, the second channel through $N^{th}$ channel plus noise components aligned with these channels, are subtracted from the received spread-spectrum CDMA signal.

As is well known in the art, correlators and matched filters may be interchanged to accomplish the same function. FIGS. 1 and 3 show alternate embodiments using correlators or matched filters. The arrangements may be varied. For example, the plurality of despreading means may be embodied as a plurality of matched filters, while the channel despreading means may be embodied as a correlator. Alternatively, the plurality of despreading means may be a combination of matched filters and correlators. Also, the spread-spectrum-processing means may be embodied as a matched filter or SAW, or as EXCLUSIVE-OR gates or other devices for mixing a despread signal with a chip-code signal. As is well known in the art, any spread-spectrum despreader or demodulator may despread the spread-spectrum CDMA signal. The particular circuits shown in FIGS. 1–4 illustrate the invention by way of example.

Figure 5:
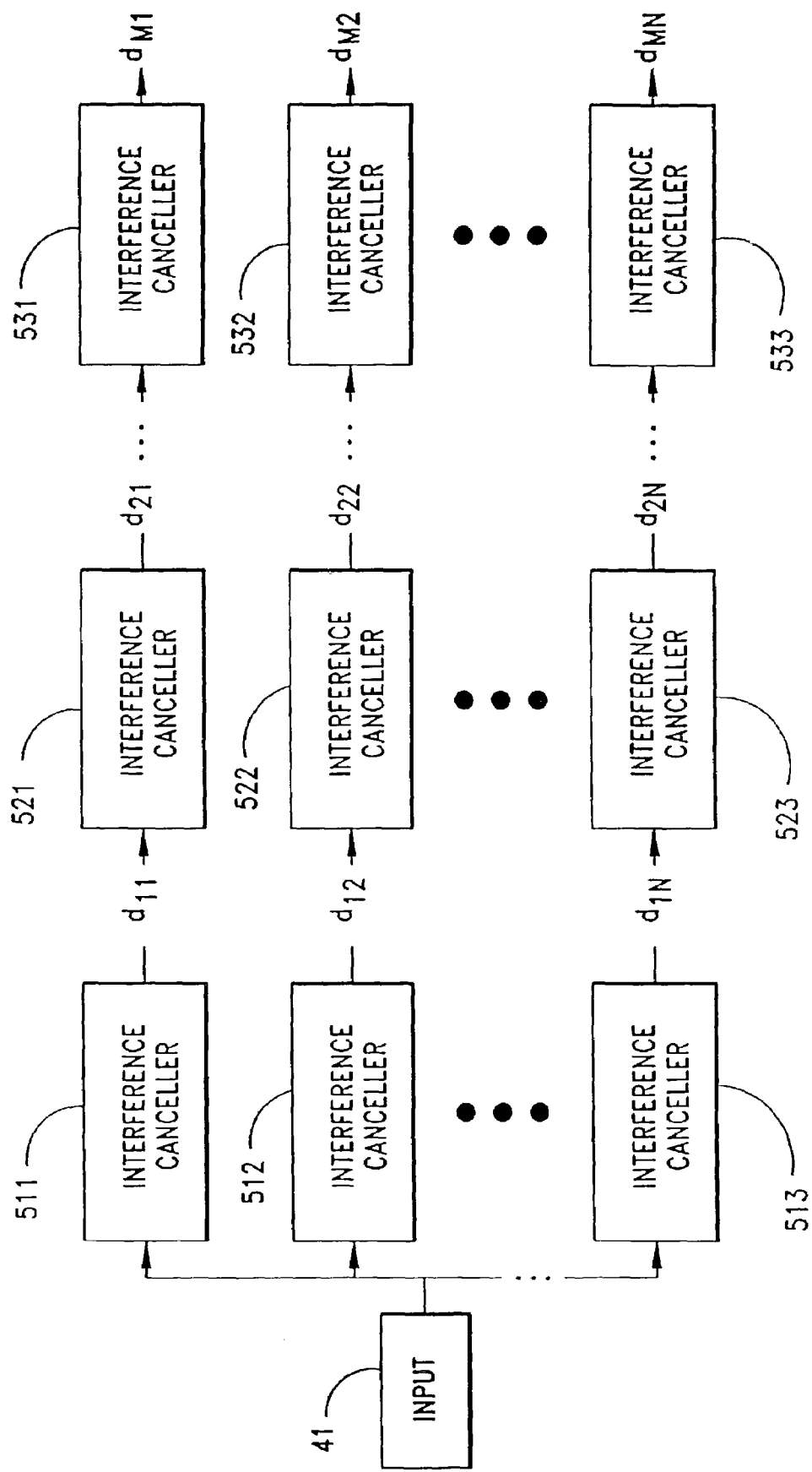
FIG. 5 is a block diagram of the spread-spectrum CDMA interference canceler having multiple iterations for processing multiple channels.

The concepts taught in FIGS. 1–4 may be repeated, as shown in FIG. 5. FIG. 5 illustrates a first plurality of interference cancelers 511, 512, 513, a second plurality of interference cancelers 521, 522, 523, through an $N^{th}$ plurality of interference cancelers 531, 532, 533. Each plurality of interference cancelers includes appropriate elements as already disclosed, and referring to FIGS. 1–4. The input is delayed through a delay device in each interference canceler.

The received spread-spectrum CDMA signals has interference canceled initially by the first plurality of interference cancelers 511, 512, 513, thereby producing a first set of estimates, i.e. a first estimate $d_{11}$, a second estimate $d_{12}$, through an $N^{th}$ estimate $d_{1N}$, of the first channel, second channel through the $N^{th}$ channel, of the spread-spectrum CDMA signal. The first set of estimates can have interference canceled by the second plurality of interference cancelers 521, 522, 523. The first set of estimates $d_{11}$, $d_{12}$, ..., $d_{1N}$, of the first channel, second channel through $N^{th}$ channel, are input to the second plurality of interference cancelers, interference canceler 521, interference canceler 522 through $N^{th}$ interference canceler 523 of the second plurality of interference cancelers. The second plurality of interference cancelers thereby produce a second set of estimates, i.e. $d_{21}$, $d_{22}$, ..., $d_{2N}$, of the first channel, second channel, through $N^{th}$ channel. Similarly, the second set estimates can pass through a third plurality of interference cancelers, and ultimately through an $M^{th}$ set of interference cancelers 531, 532, 533, respectively.

The present invention also includes a method for reducing interference in a spread-spectrum CDMA receiver having N chip-code channels. Each of the N channels is identified by a distinct chip-code signal. The method comprises the steps of despreading, using a plurality of chip-code signals, the spread-spectrum CDMA signal as a plurality of despread signals, respectively. Using a timed version of the plurality of chip-code signals, the plurality of despread signals are spread-spectrum processed with a chip-code signal corresponding to a respective despread signal. Each of the N−1 spread spectrum-processed-despread signals, is subtracted from the spread-spectrum CDMA signal, with the N−1 spread-spectrum-processed-despread signals not including a spread-spectrum-processed signal of the $i^{th}$ despread signal, thereby generating a subtracted signal. The subtracted signal is despread to generate the $i^{th}$ channel.

The probability of error $P_e$ for direct sequence, spread-spectrum CDMA system is:

$$P_e = \frac{1}{2} erfc(\alpha SNR)^{\frac{1}{2}}$$

where erfc is complementary error function, SNR is signal-to-noise ratio, and $1 \leq \alpha \leq 2$. The value of $\alpha$ depends on how a particular interference canceler system is designed.

The SNR after interference cancellation and method is given by:

$$SNR = \frac{(PG/N)^{R+1}}{1 + (PG/N)^{R+1} \frac{1}{E_b/\eta} \frac{1-(N/PG)^{R+1}}{1-N/PG}}$$

where N is the number of channels, PG is the processing gain, R is the number of repetitions of the interference canceler, $E_b$ is energy per information bit and $\eta$ is noise power spectral density.

Figure 6:
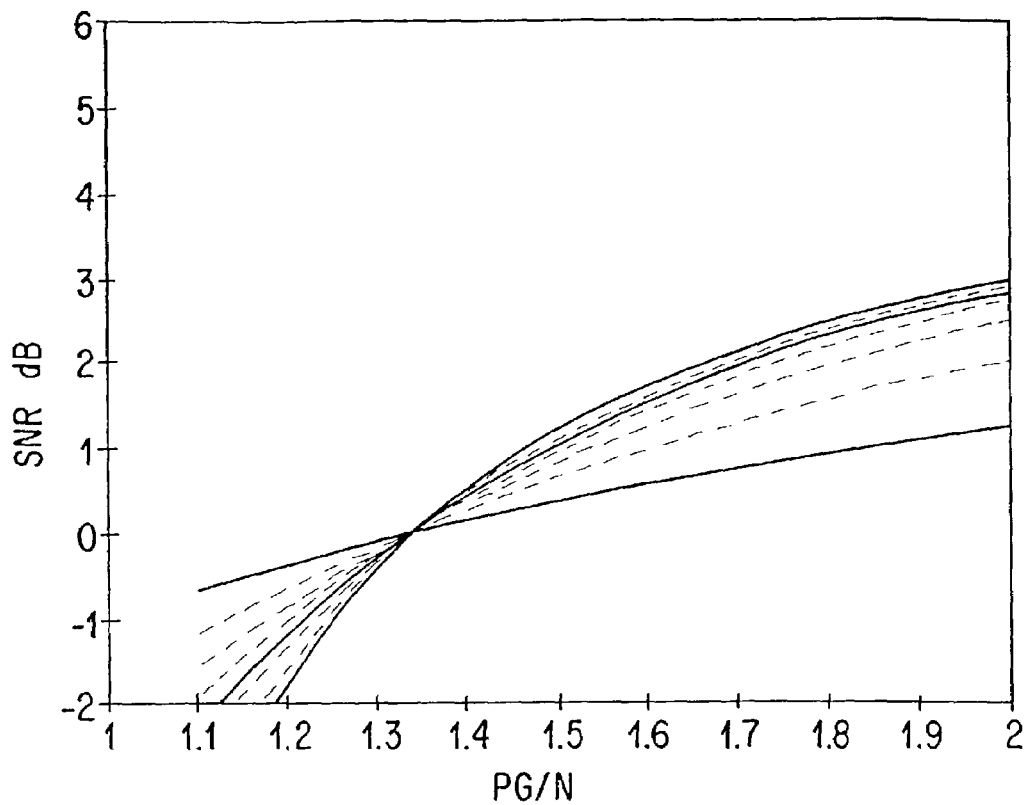
FIG. 6 illustrates theoretical performance characteristic for $E_b/\eta=6$ dB.

FIG. 6 illustrates theoretical performance characteristic, of the interference canceler and method for when $E_b/\eta=6$ dB. The performance characteristic is illustrated for SNR out of the interference canceler, versus PG/N. The lowest curve, for R=0, is the performance without the interference canceler. The curves, for R=1 and R=2, illustrates improved performance for using one and two iterations of the interference canceler as shown in FIG. 5. As PG/N→1, there is insufficient SNR to operate. If PG>N, then the output SNR from the interference canceler approaches $E_b/\eta$. Further, if $(N/PG)^{R+1} \ll 1$, then $$SNR \to (E_b/\eta)(1-N/PG).$$

Figure 7:
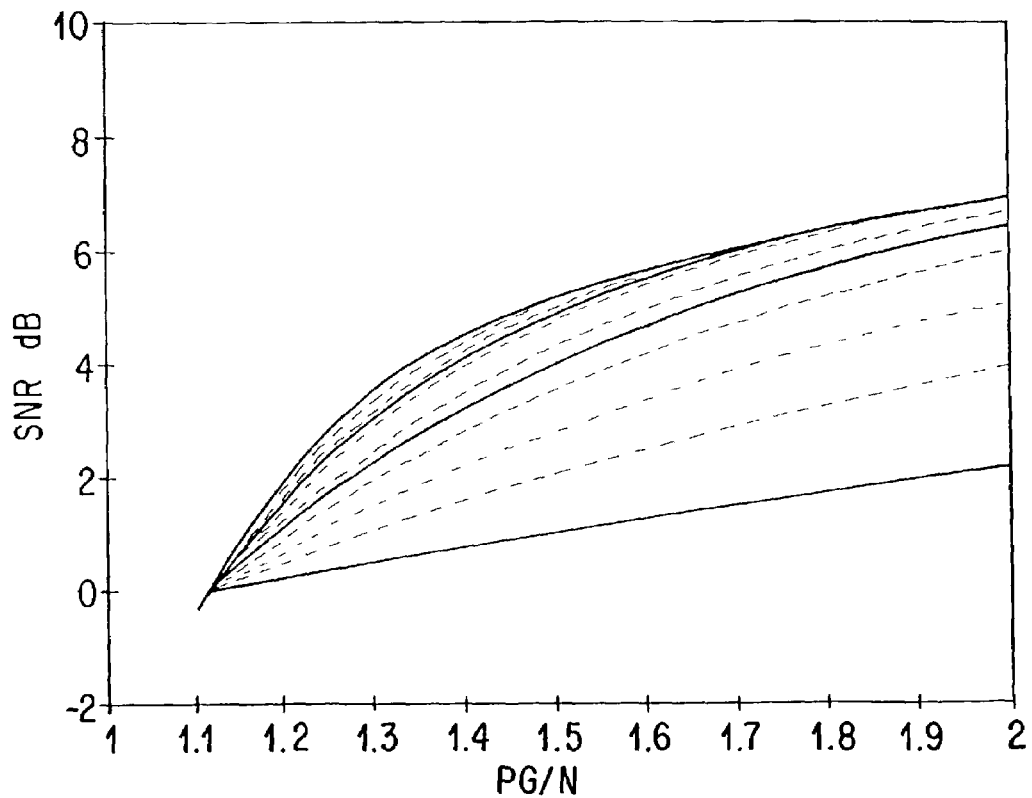
FIG. 7 illustrates theoretical performance characteristic for $E_b/\eta=10$ dB.

FIG. 7 illustrates the performance characteristic for when $E_b/\eta=10$ dB. FIG. 7 illustrates that three iterations of the interference canceler can yield a 4 dB improvement with PG/N=2.

Figure 8:
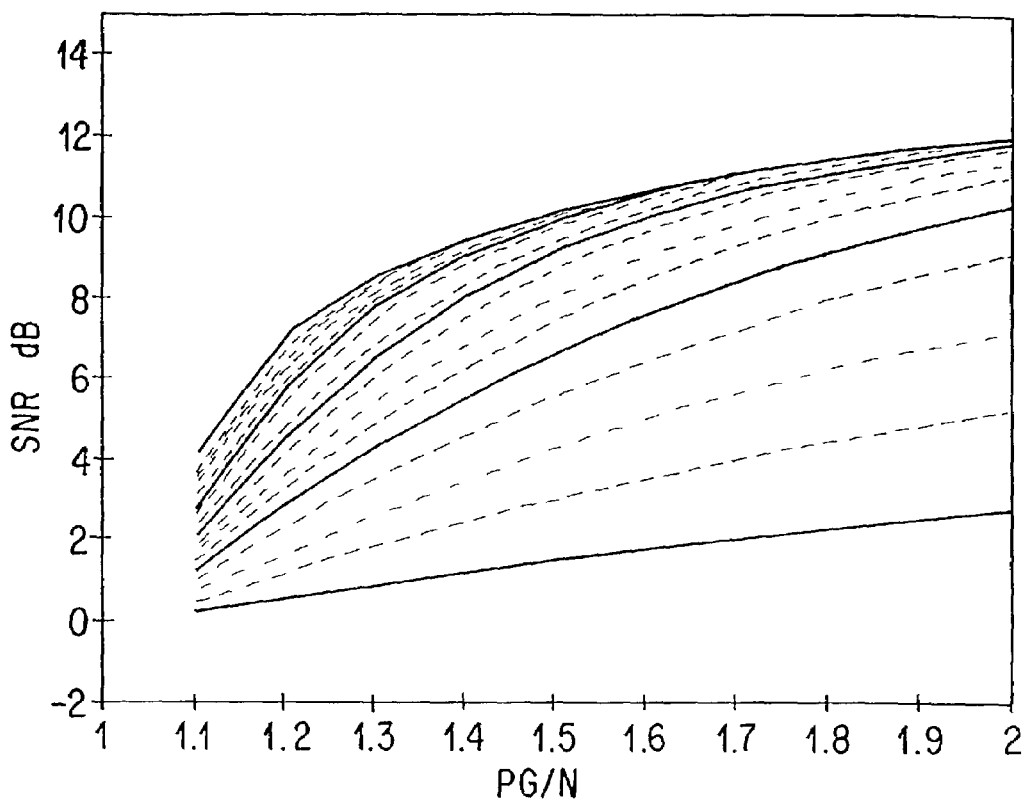
FIG. 8 illustrates theoretical performance characteristic for $E_b/\eta=15$ dB.

FIG. 8 illustrates the performance characteristic for when $E_b/\eta=15$ dB. With this bit energy to noise ratio, two iterations of the interference canceler can yield 6 dB improvement for PG/N=2.

Figure 9:
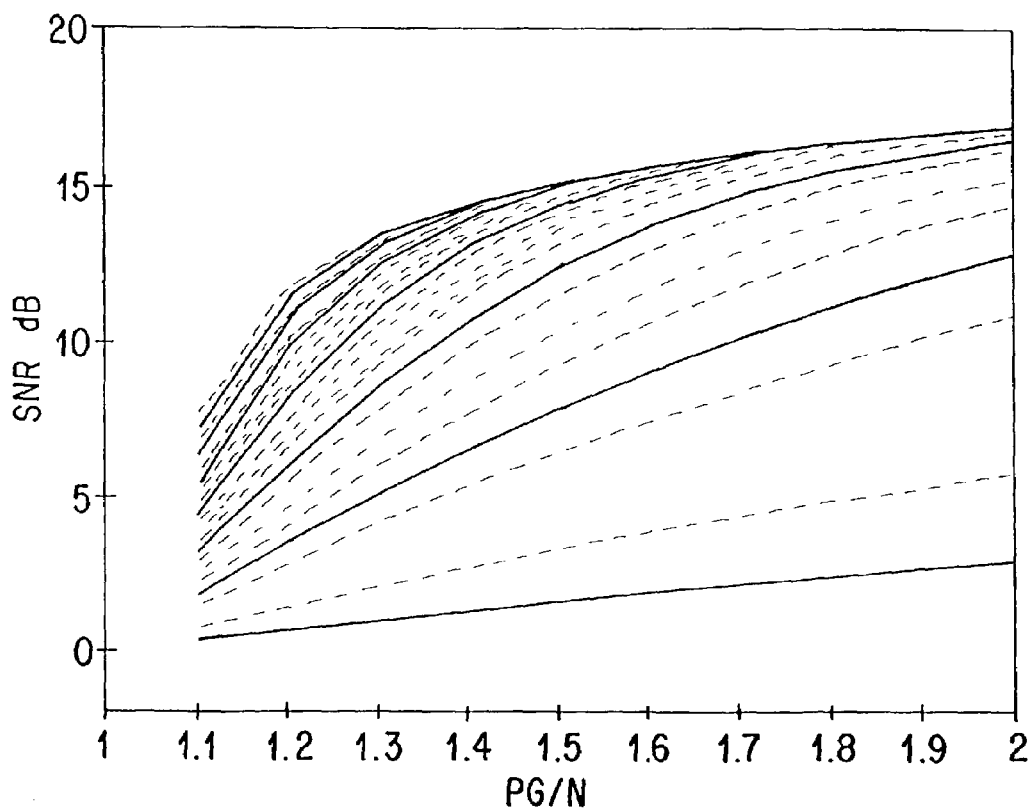
FIG. 9 illustrates theoretical performance characteristic for $E_b/\eta=20$ dB.
Figure 10:
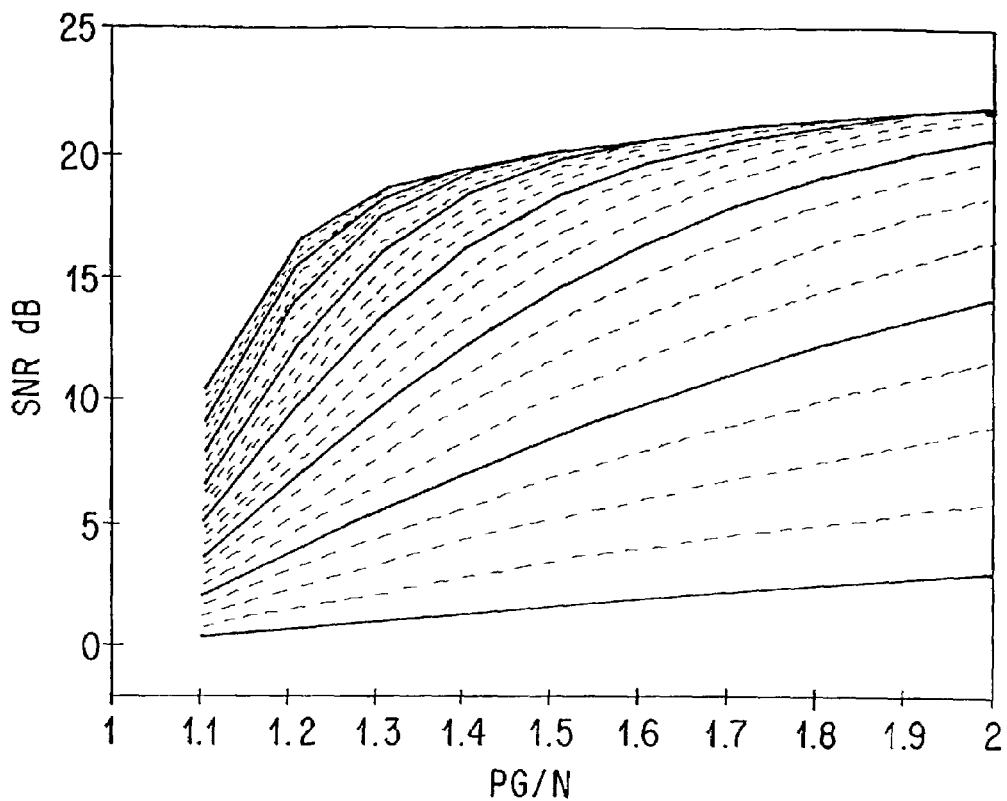
FIG. 10 illustrates theoretical performance characteristic for $E_b/\eta=25$ dB.
Figure 11:
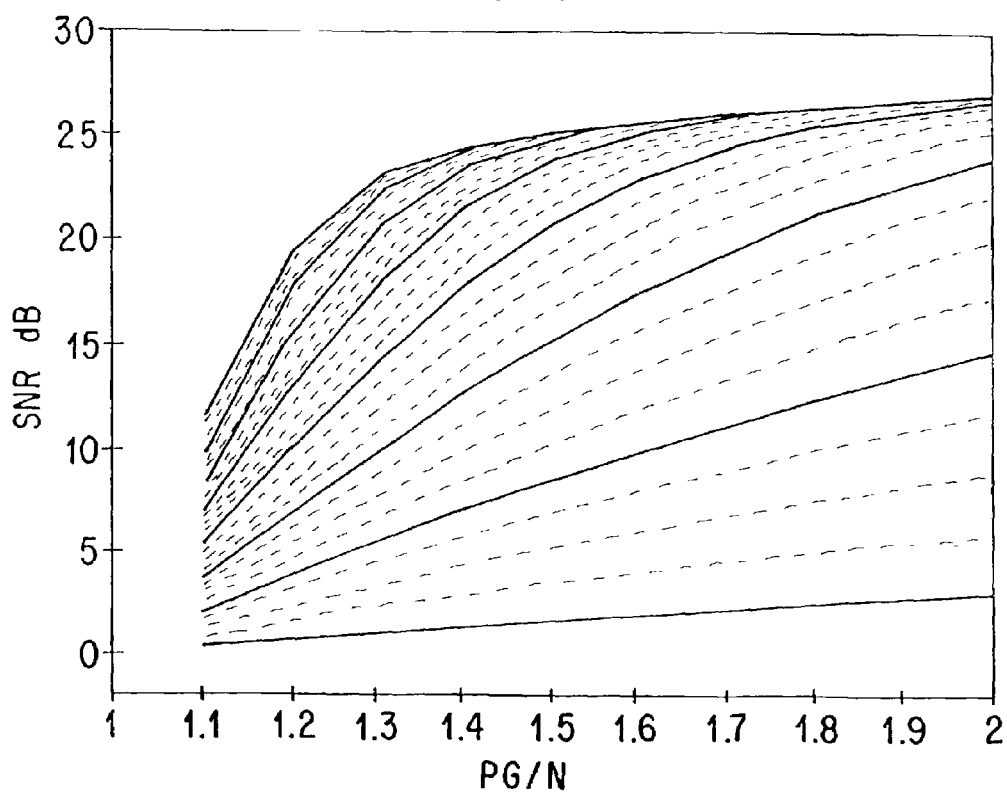
FIG. 11 illustrates theoretical performance characteristic for $E_b/\eta=30$ dB.

FIG. 9 illustrates the performance characteristic for when $E_b/\eta=20$ dB. With this bit energy to noise ratio, two iterations of the interference canceler can yield 6 dB improvement for PG/N=2. Similarly, FIGS. 10 and 11 shows that one iteration of the interference canceler can yield more than 10 db improvement for PG/N=2.

Figure 12:
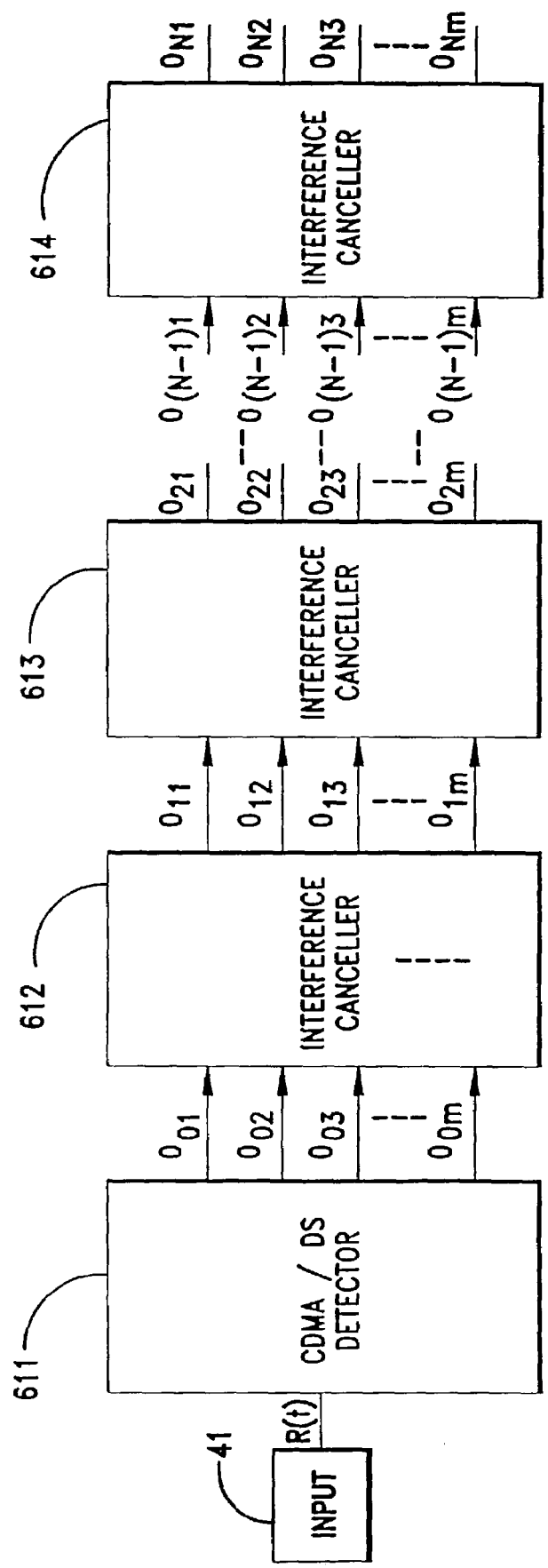
FIG. 12 is a block diagram of interference cancelers connected together.

The present invention may be extended to a plurality of interference cancelers. As shown in FIG. 12, a received spread-spectrum signal, R(t), is despread and detected by CDMA/DS detector 611. Each of the channels is represented as outputs $O_{01}, O_{02}, O_{03}, \ldots, O_{0m}$. Thus, each output is a despread, spread-spectrum channel from a received spread-spectrum signal, R(t).

Each of the outputs of the CDMA/DS detector 611 is passed through a plurality of interference cancelers 612, 613, . . . , 614, which are serially connected. Each of the spread-spectrum channels passes through the interference canceling processes as discussed previously. The input to each interference canceler is attained by sampling and holding the output of the previous stage once per bit time. For channel i, the first interference canceler samples the output of the CDMA/DS detector at time $t=T+\tau_1$. This value is held constant as the input until $t=2T+\tau_1$ at which point the next bit value is sample. Thus, the input waveforms to the interference canceler are estimates, $\hat{d}_i(t-\tau_i)$, of the original data waveform $(d_i(t-\tau_i)$, and the outputs are second estimates, $\hat{\hat{d}}_i(t-\tau_i)$. The M spread-spectrum channel outputs $O_{0i}$, i=1, 2, . . . , M, are passed through interference canceler 612 to produce a new corresponding set of channel outputs $O_{1i}$, i=1, 2, . . . , M.

Figure 13:
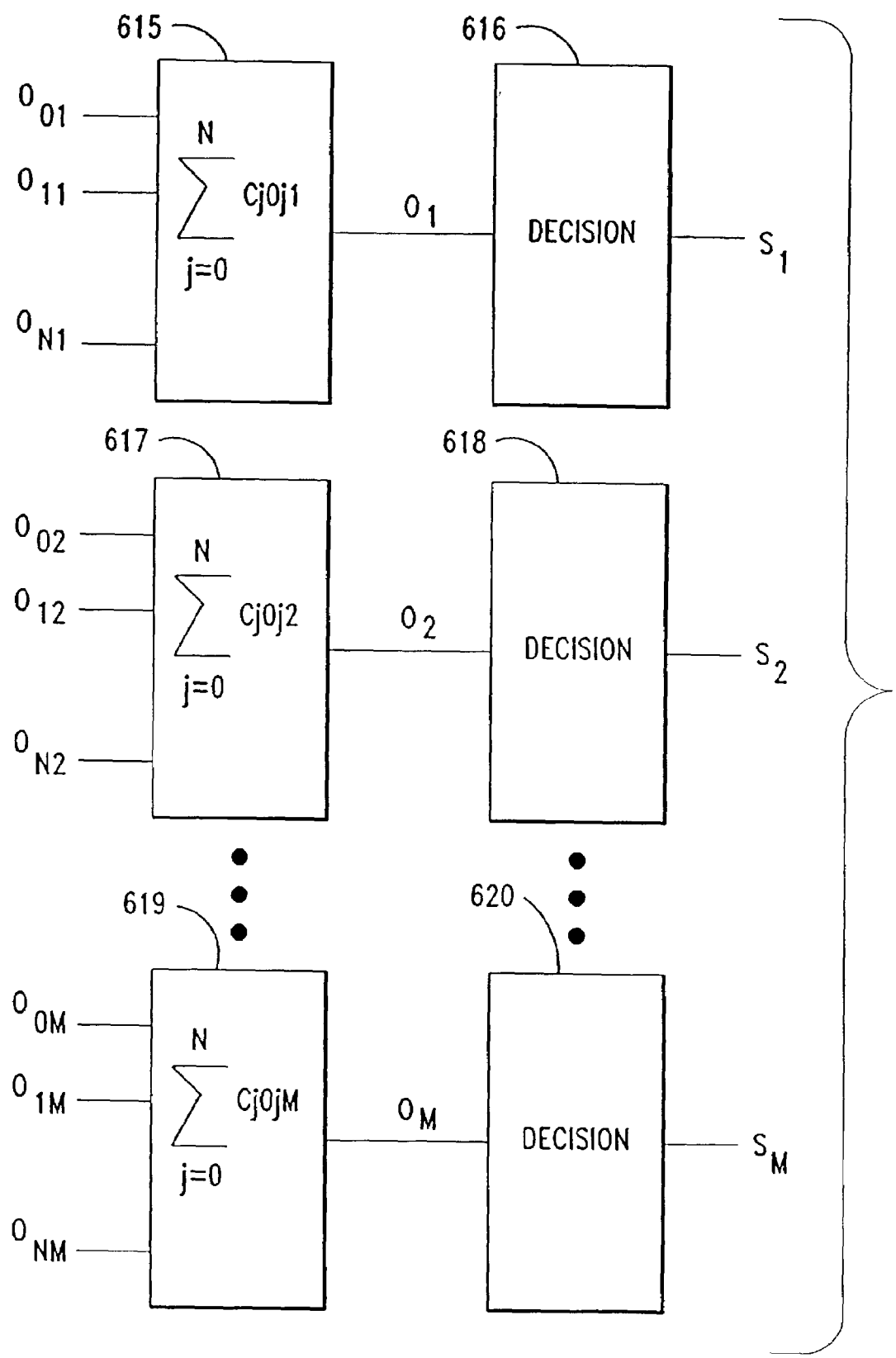
FIG. 13 is a block diagram combining the outputs of the interference cancelers of FIG. 12.

As shown in FIG. 13, the outputs of a particular spread-spectrum channel, which are at the output of each of the interference cancelers, may be combined. Accordingly, combiner 615 can combine the output of the first channel which is from CDMA/DS detector 611, and the output $O_{11}$ from the first interference canceler 612, and the output $O_{21}$ from the second interference canceler 613, through the output $O_{N1}$ from the $N^{th}$ interference canceler 614. Each output to be combined is of the corresponding bit. Therefore "s" bit time delays is inserted for each $O_{s1}$. The combined outputs are then passed through the decision device 616. This can be done for each spread spectrum channel, and therefore designate the outputs of each of the combiners 615, 617, 619 as averaged outputs $O_1$ for channel one, averaged output $O_2$ for channel two, and averaged output $O_M$ for channel M. Each of the averaged outputs are sequentially passed through decision device 616, decision device 618, and decision device 620. Preferably, the averaged outputs have multiplying factor $c_j$ which may vary according to a particular design. In a preferred embodiment, $c_j=\frac{1}{2^j}$. This allows the outputs of the various interference cancelers to be combined in a particular manner.

FIGS. 14–17 illustrate simulation performance characteristics for the arrangement of FIGS. 12 and 13. FIGS. 14–17 are for asynchronous channel (relative time delays are uniformly distributed between 0 and bit time, T), processing gain of 100, all user have equal powers, and thermal signal to noise ratio ($E_bN$ of 30 dB). Length 8191 Gold codes are used for the PN sequences.

Figure 14:
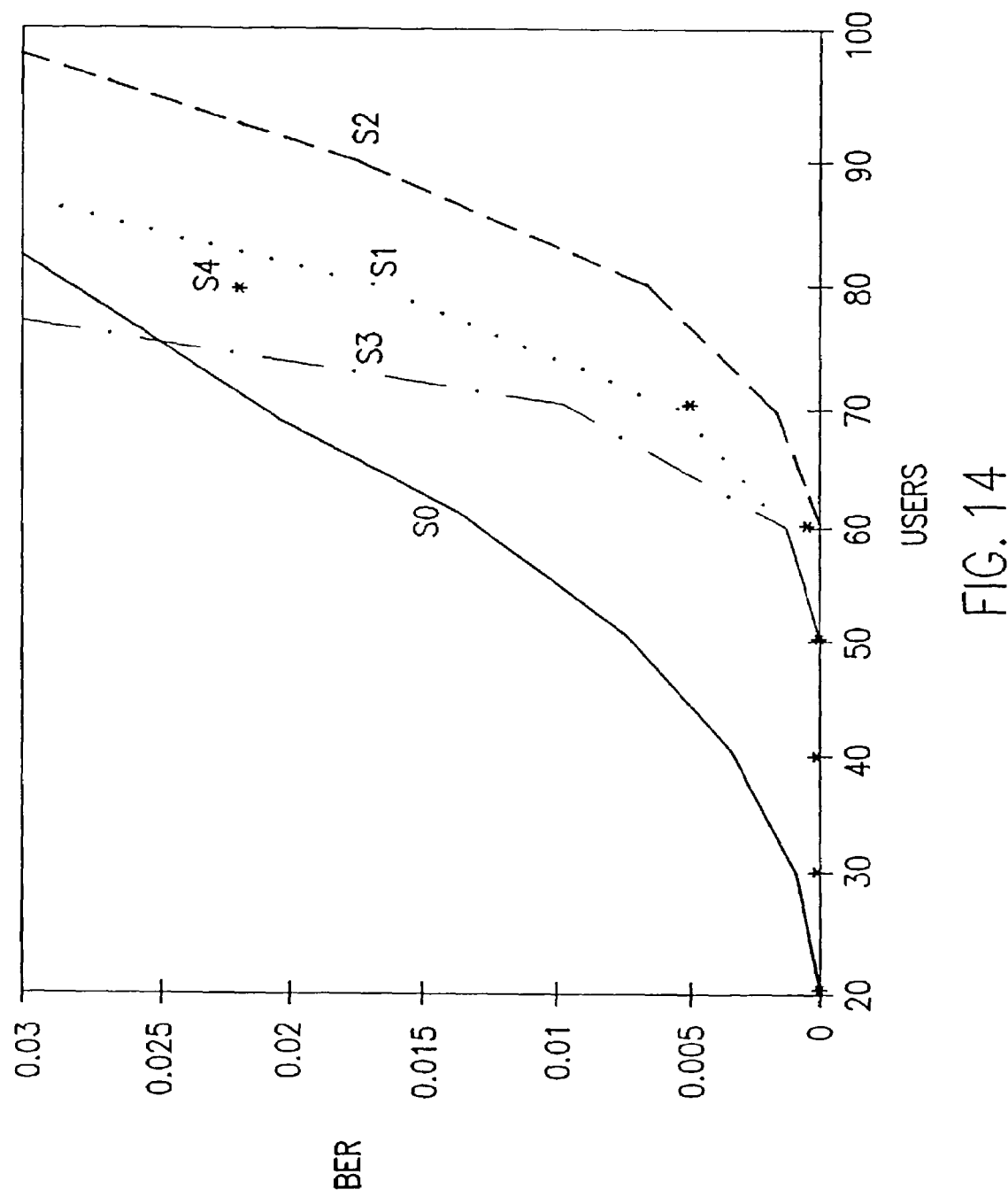
FIG. 14 illustrates simulation performance characteristics for asynchronous, PG=100, Equal Powers, EbN=30 dB.

In FIG. 14, performance characteristic of each of the output stages of FIG. 12 is shown. Thus, S0 represents the BER performance at the output of CDMA/DS detector 611, S1 represents the BER performance at the output of interference canceler 612, S2 represents the BER performance at the output of interference canceler 613, etc. No combining of the outputs of the interference cancelers are used in determining the performance characteristic shown in FIG. 14. Instead, the performance characteristic is for repetitively using interference cancelers. As a guideline, in each of the subsequent figures the output for each characteristic of CDMA/DS detector 611 is shown in each figure.

Figure 15:
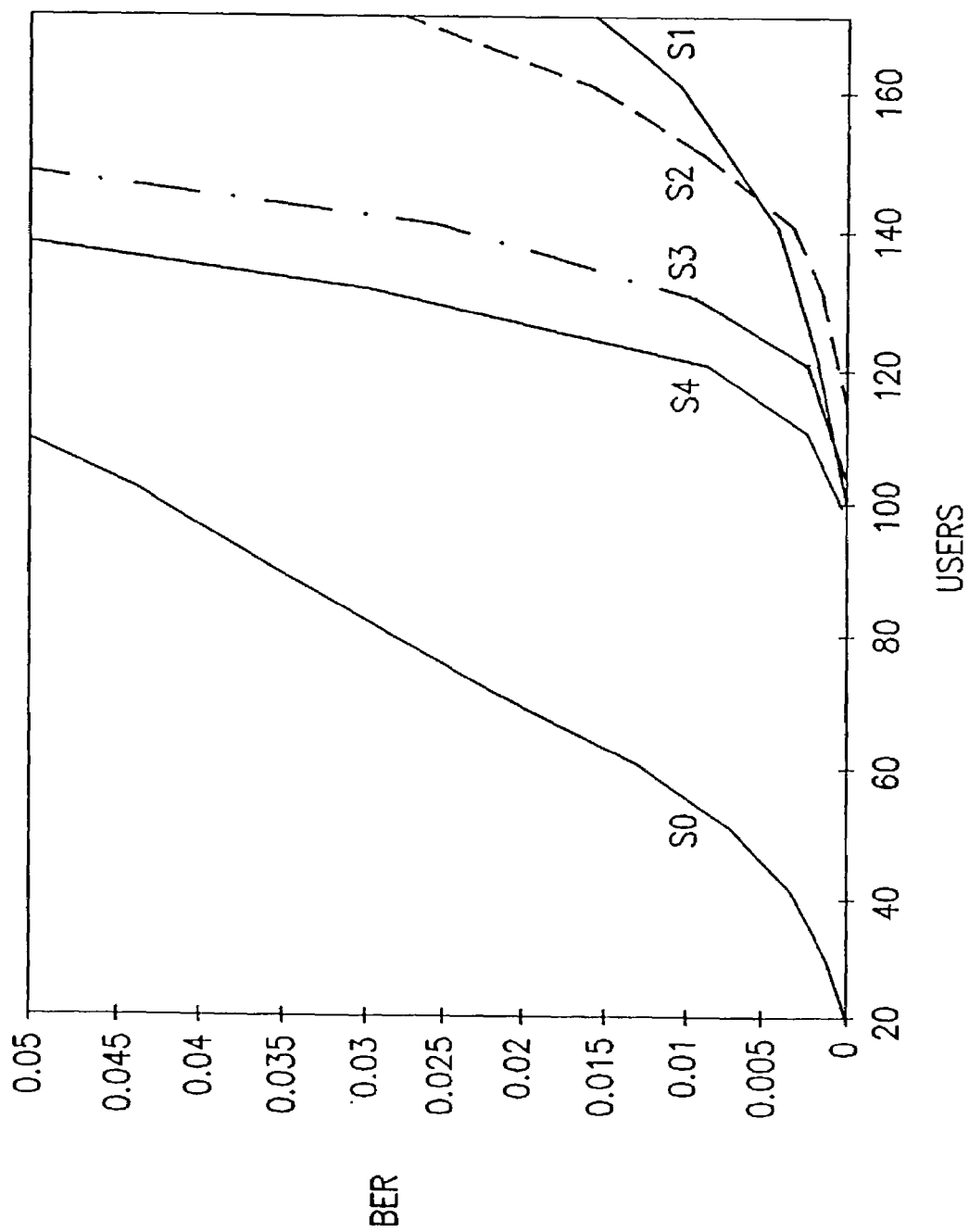
FIG. 15 illustrates simulation performance characteristics for asynchronous, PG=100, Equal Powers, EbN=30 dB.

FIG. 15 shows the performance characteristic when the output of subsequent interference cancelers are combined. This is shown for a particular channel. Thus, curve S0 is the output of the CDMA/DS detector 611. Curve S1 represents the BER performance of the average of the outputs of CDMA/DS detector 611 and interference canceler 612. Here $C_0 = C_1 = \frac{1}{2} C_j = 0$, j not equal to zero, one. Curve S2 represents the BER performance of the average output of interference canceler 613 and interference canceler 612. Curve S2 is determined using the combiner shown in FIG. 13. Here, $C_1$ and $C_2$ are set equal to ½ and all other $C_j$ set to zero. Similarly, curve S3 is the performance of the output of a second and third interference canceler averaged together. Thus, curve S3 is the performance characteristic of the average between outputs of a second and third interference canceler. Curve S4 is the performance characteristic of the average output of a third and fourth interference canceler. Only two interference cancelers are taken at a time for determining a performance characteristic of an average output of those to particular interference cancelers.

Figure 16:
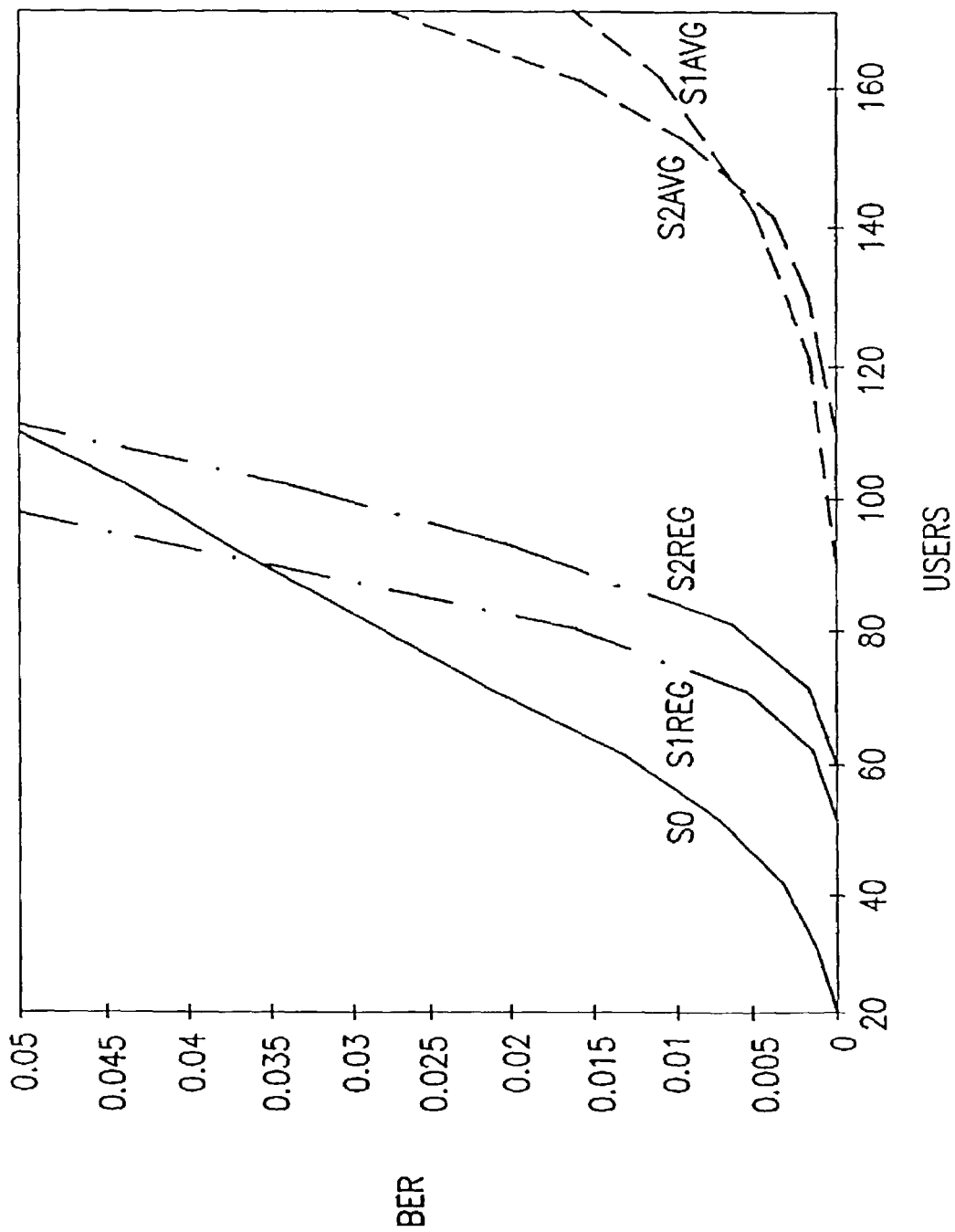
FIG. 16 illustrates simulation performance characteristics for asynchronous, PG=100, Equal Powers, EbN=30 dB.

FIG. 16 shows the regular outputs for the CDMA/DS detector 611, and a first and second interference canceler 612, 613. Additionally, the average output of the CDMA/DS detector 611 and the first interference canceler 612 is shown as S1 AVG. The BER performance of the average of the outputs of the first interference canceler 612 and the second interference canceler 613 is shown as the average output S2 AVG.

Figure 17:
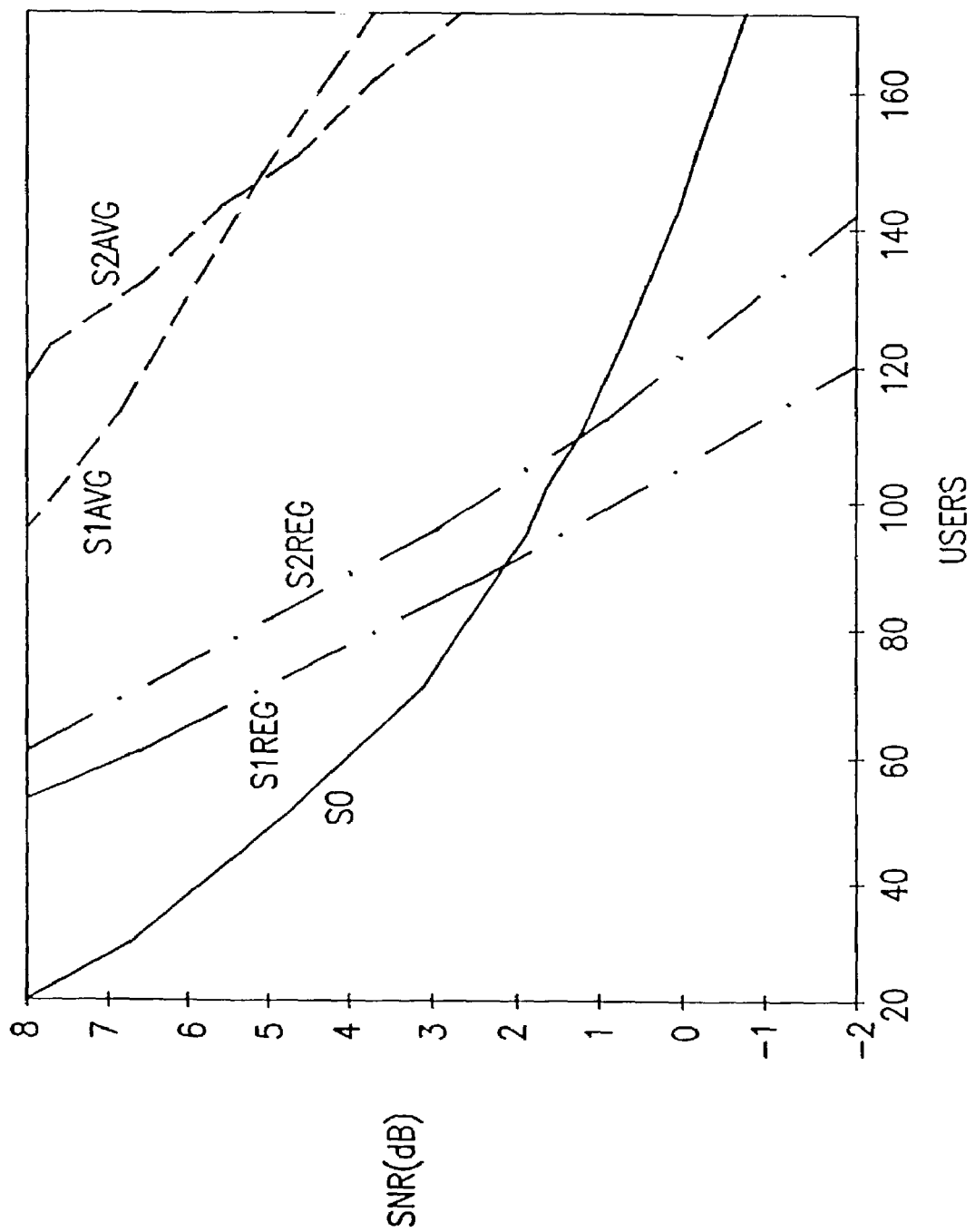
FIG. 17 illustrates simulation performance characteristics for asynchronous, PG=100, Equal Powers, EbN=30 db.

FIG. 17 shows performance characteristic correspondence for those of FIG. 16, but in terms of signal to-noise ratio in decibels (dB).

It will be apparent to those skilled in the art that various modifications can be made to the spread-spectrum CDMA interference canceler and method of the instant invention without departing from the scope or spirit of the invention, and it is intended that the present invention cover modifications and variations of the spread-spectrum CDMA interference canceler and method provided they come within the scope of the appended claims and their equivalents.

What is claimed is:

1. A remote unit receiver for recovering data transmitted over a plurality of channels employing a wireless code division multiple access communication technique, comprising:

a unit for receiving the plurality of channels as a received signal, each channel associated with a code;

for each of the plurality of channels, a subtractor for subtracting others of the plurality of channels from the received signal and despreading a result of that subtraction as data for that channel;

for each channel, a first mixer operatively coupled to the input for despreading the received signal with that channel code; and for each channel, a second mixer for respreading that channel despread signal with a respective channel code; wherein the respreading channel code is aligned to a timing of the despread received signal; and wherein for each channel, the subtractor subtracts from the received signal the respread channels other than that channel.

2. A remote unit receiver for recovering data transmitted over a plurality of channels employing a wireless code division multiple access communication technique, comprising:

a unit for receiving the plurality of channels as a received signal, each channel associated with a code;

for each of the plurality of channels, a subtractor for subtracting others of the plurality of channels from the received signal and despreading a result of that subtraction as data for that channel;

for each channel, a matched filter operatively coupled to the receiving unit for despreading the received signal with that channel code; and for each channel, a mixer for respreading that channel despread signal with a respective channel code;

wherein the respreading channel code is aligned to a timing of the despread received signal; and wherein for each channel, the subtractor subtracts from the received signal the respread channels other than that channel.

* * * * *

UNITED STATES PATENT AND TRADEMARK OFFICE
CERTIFICATE OF CORRECTION

PATENT NO. : 7,167,462 B2  Page 1 of 2
APPLICATION NO. : 10/164209
DATED : January 23, 2007
INVENTOR(S) : Schilling et al.

It is certified that error appears in the above-identified patent and that said Letters Patent is hereby corrected as shown below:

Title page at Item (73), Assignee:, delete "InterDigital Technologies Corporation" and insert therefor --InterDigital Technology Corporation--.

Title page at Item (56), FOREIGN PATENT DOCUMENTS, page 1, right column, delete line 1, and insert therefor --JP 483579 3/1992--.

Title page at Item (56), U.S. PATENT DOCUMENTS, page 2, after "5,103,459 A 4/1992 Gilhousen et al.", insert --5,136,612 8/1992 Bi--.

Title page at Item (56), FOREIGN PATENT DOCUMENTS, page 2, left column, delete lines 1, 2, and 3 and insert therefor --JP 732107 2/1995--.

Title page at Item (56), OTHER PUBLICATIONS, page 2, right column, line 67, before the word "Commun.", delete "Tans." and insert therefor --Trans.--.

Title page at Item (56), OTHER PUBLICATIONS, page 2, right column, line 74, before the words "Multiple-Access", delete "Code-Divisoin" and insert therefor --Code-Division--.

Title page at Item (56), OTHER PUBLICATIONS, page 2, right column, line 75, before the word "Commun.", delete "Aras" and insert therefor --Areas--.

At column 1, line 39, before the word "turn", delete "is" and insert therefor --in--.

At column 2, line 21, after the words "Equal Powers", delete "EbN=30" and insert therefor --$E_b N=30$--.

At column 2, line 23, after the words "Equal Powers", delete "EbN=30" and insert therefor --$E_b N=30$--.

At column 2, line 25, after the words "Equal Powers", delete "EbN=30" and insert therefor --$E_b N=30$--.

Signed and Sealed this

Seventeenth Day of August, 2010

David J. Kappos
*Director of the United States Patent and Trademark Office*

CERTIFICATE OF CORRECTION (continued)
U.S. Pat. No. 7,167,462 B2

At column 2, line 27, after the words "Equal Powers", delete "EbN=30 db" and insert therefor --$E_bN=30$ dB--.

At column 5, line 41, after the word "integrator", delete "147" and insert therefor --146--.

At column 6, line 22, after the words "chip-code", delete "signal" and insert therefor --signals--.

At column 8, line 34, after the word "device", delete "form" and insert therefor --from--.

At column 8, line 36, after the word "outputted", delete "form" and insert therefor --from--.

At column 8, line 47, after the word "matched", insert --to--.

At column 8, line 65, after the word "channels", delete "form" and insert therefor --from--.

At column 9, line 43, before the word "input", delete ". The" and insert therefor --, the--.

At column 9, line 59, after the word "thereby", delete "produce" and insert therefor --produces--.

At column 9, before the word "estimates", insert --of--.

At column 10, line 62, before the words "that one", delete "shows" and insert therefor --show--.

At column 10, line 64, before the word "improvement", delete "db" and insert therefor --dB--.

At column 11, line 13, after the words "at time", delete "$t=T+\tau_1$" and insert therefor --$t=T+\tau_i$--.

At column 11, line 14, after the words "input until", delete "$t=2T+\tau_1$" and insert therefor --$t=2T+\tau_i$--.

At column 11, line 15, after the words "value is", delete "sample" and insert therefor --sampled--.

At column 11, line 17, after the word "waveform", delete "$(d_i(t-\tau_1)$" and insert therefor --$d_i(t-\tau_i)$--.

At column 11, line 18, after "mates", delete "$\hat{d}_1(t-\tau_i)$" and insert therefor --$\hat{d}_i(t-\tau_i)$--.

At column 11, line 19, before the words "are passed", delete "$O_{01}$, i=1,2,..., M," and insert therefor --$O_{0i}$, i=1,2,...,M,--.

At column 11, line 33, after the word "delays", delete "is" and insert therefor --are--.

At column 11, line 48, after the word "all", delete "user" and insert therefor --users--.

At column 12, line 6, after the words "equal to", delete "1/2and" and insert therefor --1/2 and--.

At column 12, line 14, after the word "those", delete "to" and insert therefor --two--.

At column 12, line 25, before the words "of signal", delete "interms" and insert therefor --in terms--.